(12) United States Patent
Franklin et al.

(10) Patent No.: US 9,207,143 B2
(45) Date of Patent: Dec. 8, 2015

(54) SYSTEM AND METHOD FOR DETERMINING LEAKS IN A COMPLEX SYSTEM

(75) Inventors: Charles M. Franklin, Katy, TX (US); Richard A. Cully, Katy, TX (US)

(73) Assignee: Innovative Pressure Testing, LLC, Houston, TX (US)

(*) Notice: Subject to any disclaimer, the term of this patent is extended or adjusted under 35 U.S.C. 154(b) by 922 days.

(21) Appl. No.: 13/291,895

(22) Filed: Nov. 8, 2011

(65) Prior Publication Data

US 2012/0150455 A1    Jun. 14, 2012

Related U.S. Application Data

(63) Continuation-in-part of application No. 12/833,216, filed on Jul. 9, 2010, now Pat. No. 8,380,448.

(60) Provisional application No. 61/234,736, filed on Aug. 18, 2009, provisional application No. 61/311,863, filed on Mar. 9, 2010.

(51) Int. Cl.
*G01L 27/00* (2006.01)
*G01M 3/28* (2006.01)
(Continued)

(52) U.S. Cl.
CPC ............ *G01M 3/2815* (2013.01); *G01M 3/243* (2013.01); *G01M 3/26* (2013.01); *G01M 3/2876* (2013.01)

(58) Field of Classification Search
USPC .................................................. 702/51, 114
See application file for complete search history.

(56) References Cited

U.S. PATENT DOCUMENTS 4,383,436 A * 5/1983 Hailey .............................. 73/46
4,608,857 A   9/1986 Mertens et al.
(Continued)

FOREIGN PATENT DOCUMENTS

| JP | 2002243572 | 8/2002 |
| JP | 2009092585 | 4/2009 |
| WO | WO 03046502 | 6/2003 |

OTHER PUBLICATIONS

International Search Report, Application No. PCT/US10/41478, mailed Feb. 14, 2011.

(Continued)

*Primary Examiner* — Paul D Lee
(74) *Attorney, Agent, or Firm* — Conley Rose, P.C.

(57) ABSTRACT

A leak detection system includes a pressure system that requires leak and/or pressure testing. A pressure sensor coupled to the pressure system senses a first pressure at time $t_0$, after which fluid pumping system provides a selected volume of test fluid to the pressure system. The pressure sensor senses a test pressure at time $t_1$ and at selected intervals 'n' to time $t_{(n+1)}$ and transmits a signal reflective of the pressures at each time to a computer system for recording and storage on a computer readable medium. A software application operating on the computer system is configured to calculate a leak detection value, which is a function of a ratio of the first pressure at time $t_0$ and the test pressure at time $t_1$; the test pressure at time $t_1$ and the test pressure at time $t_2$; and so on to a test pressure at the time $n$ and the test pressure at the time $t_{(n+1)}$. A graphical output displays the leak detection value as a function of time.

18 Claims, 17 Drawing Sheets

(51) Int. Cl.
*G01M 3/24* (2006.01)
*G01M 3/26* (2006.01)

(56) References Cited

U.S. PATENT DOCUMENTS

| | | | |
|---|---|---|---|
| 4,826,482 A * | 5/1989 | Kamen | 604/67 |
| 4,947,352 A | 8/1990 | Jenkins | |
| 5,078,006 A | 1/1992 | Maresca et al. | |
| 5,090,234 A | 2/1992 | Maresca et al. | |
| 5,163,314 A | 11/1992 | Maresca et al. | |
| 5,189,904 A | 3/1993 | Maresca et al. | |
| 5,375,455 A | 12/1994 | Maresca et al. | |
| 5,526,679 A | 6/1996 | Filippi | |
| 5,586,050 A * | 12/1996 | Makel et al. | 702/51 |
| 5,948,969 A | 9/1999 | Fierro et al. | |
| 6,082,182 A | 7/2000 | Fierro et al. | |
| 6,244,100 B1 | 6/2001 | Hastings et al. | |
| 6,549,857 B2 | 4/2003 | Fierro et al. | |
| 6,655,422 B2 * | 12/2003 | Shock | 141/83 |
| 2005/0222698 A1 * | 10/2005 | Eryurek et al. | 700/90 |
| 2006/0032550 A1 * | 2/2006 | Wodjenski | 141/248 |
| 2006/0167400 A1 * | 7/2006 | Ellingboe et al. | 604/6.14 |
| 2008/0185143 A1 * | 8/2008 | Winters et al. | 166/250.07 |
| 2008/0223111 A1 * | 9/2008 | Mc Donald et al. | 73/37 |

OTHER PUBLICATIONS

International Preliminary Report on Patentability, Application No. PCT/US10/41478, mail Mar. 1, 2012.

* cited by examiner

TEST REPORT

TEST EXECUTION SUMMARY

| Time | Test | Comments | Result |
|---|---|---|---|
| 20:16 | BOP 1 | | ☑ Pass |
| 20:59 | BOP 2 | | ☑ Pass |
| 21:42 | BOP 3 | LP Failed. Leak corrected at M8 | ☒ Fail |
| 21:51 | BOP 3a | | ☑ Pass |
| 22:19 | BOP 4 | HP Leak Ganket failure | ☑ Pass |
| 22:47 | BOP 4a | | ☒ Fail |

*FIG. 17*

| Valve/Ram | Side/Size | Covered | BOP 1 | BOP 2 | BOP 3 | BOP 4 | BOP 5 |
|---|---|---|---|---|---|---|---|
| A1 | 4.500 | ✓ | ✓ | | | | |
| BR1 | No Pipe | ✓ | | | ✓ | | |
| VR1 | 5.500 | ✓ | | | | ✓ | |
| VR2 | 7.000 | ✓ | | ✓ | | | |
| VR3 | 4.500 | ✓ | | | | | ✓ |
| KH1 | R | ✓ | | | ✓ | | ✓ |
| V3 | T | ✓ | ✓ | ✓ | | ✓ | |
| V4 | T | ✓ | | | ✓ | | ✓ |
| V8 | B | ✓ | ✓ | ✓ | | ✓ | |
| V9 | L | ✓ | ✓ | ✓ | | | |
| V9 | R | ✓ | | | | | ✓ |
| V10 | L | ✓ | | | | ✓ | |
| V10 | R | ✓ | | | ✓ | | |
| V11 | B | ✓ | | | ✓ | | ✓ |
| V13 | B | ✓ | ✓ | ✓ | | ✓ | |
| V14 | B | ✓ | ✓ | ✓ | | ✓ | |
| V16 | B | ✓ | | | ✓ | | ✓ |
| V25 | B | ✓ | | | ✓ | | ✓ |
| V40 | L | ✓ | ✓ | | | | |
| V46 | L | ✓ | ✓ | ✓ | | ✓ | |
| V48 | L | ✓ | ✓ | ✓ | | ✓ | |

*FIG. 19*

SYSTEM AND METHOD FOR DETERMINING LEAKS IN A COMPLEX SYSTEM

PRIORITY CLAIM

This application is a continuation-in-part of U.S. patent application Ser. No. 12/833,216, filed Jul. 9, 2010 and entitled "System and Method for Detecting Leaks", which claims the benefit of both U.S. Provisional Patent Application No. 61/234,736, filed Aug. 18, 2009 and entitled "System and Method for Detecting Leaks", and U.S. Provisional Patent Application No. 61/311,863, filed Mar. 9, 2010 and entitled "System and Method for Detecting Leaks".

FIELD

Systems and methods are disclosed for detecting leaks and for testing the pressure integrity of a pressure system, examples of which include various pressure systems configured to hold and/or transport fluids, such as liquids, gases and mixtures thereof. More specifically, procedures and methods are disclosed for reliably and efficiently verifying the pressure integrity of equipment such as the blowout preventers and valve components located in deep water oil and gas operations.

BACKGROUND

Tubes, valves, seals, containers, tanks, receivers, pressure vessels, pipelines, rigid conduits, flexible hoses or conduit, heat exchangers, and other similar fluid control components, are typically configured to retain, direct and/or transport fluids under pressure. These components may be assembled into a wide variety of pressurized fluid systems that include systems for operating blowout preventers, mud systems, hydraulic systems, high pressure air systems, steam systems, and the like.

One representative example of a pressure system is a pipeline for transporting natural gas or other hydrocarbons. Another example is a natural gas and/or oil well and/or wells of other types, whether being actively drilled or already producing. These wells typically transport fluids from the producing geological formation to a well head. Oil and gas wells include one or more of the following components: a Christmas tree or well head; production tubing; casing; drill pipe; blowout preventers (BOPs); completion equipment; coiled tubing; snubbing equipment; and other similar and typical components. Yet another example includes hydraulic and fuel lines of various types for transporting fluids for use in mechanical devices. Storage containers for retaining fluids therein and pressure systems which include additional types of fluid control components may also fall within the scope of this disclosure.

The fluids retained or transported within pressure systems typically include one or more gases, liquids, or combinations thereof, including any solid components entrained within the fluid. As one representative example, a typical fluid may include methane or natural gas, carbon dioxide, hydrogen sulfide, natural gas liquids, water, and nitrogen. Another example of a fluid in a pressure system, crude oil coming from a well typically includes methane, propane, octane, and longer-chained hydrocarbons, including heavy oil/asphaltenes. Yet another example is hydraulic fluid within a hydraulic line.

Pressure systems and the individual components that comprise the system, typically are tested to ensure the pressure system is capable of maintaining pressure integrity and that the pressure system is not leaking. For example, a pressure system typically is tested to provide assurance that the fluid system is capable of retaining the fluid held therein at a selected pressure (e.g., a maximum pressure rating or maximum rated pressure which can be 110%-150% of normal operating pressure) without the fluid leaking or escaping from the pressure system.

It is understood that in connection with liquids, gases and mixtures thereof which exhibit a potentially significant change in pressure as a function of the fluid's temperature, it can be difficult to determine whether a change in pressure, typically, although not necessarily, a decrease in pressure, in a pressure system is merely a result of the change in temperature of the fluid, or if it is a result of a leak somewhere within the pressure system.

By way of example, the pressure of a volume of a drilling fluid in a fixed container or pressure vessel used in oil and gas drilling can vary significantly with temperature. In deepwater offshore drilling in which the drilling fluid is stored at a temperature of between 80° F. to 120° F. at the surface, for instance, the temperature fluctuations can be quite large. The drilling fluid cools as it passes from the drilling platform, through drill pipe and/or the riser that is surrounded by the ocean, to a wellhead or blow-out preventer that can be several thousand feet below the surface of the ocean and on the sea floor where the ambient, surrounding water temperature might be as low as 34° F. Thus, there can be a large and rapid transfer of heat energy from the drilling fluid, through the containing drill pipe and/or riser, to the surrounding ocean, which, in turn, causes a sometimes significant decrease in both the temperature and the pressure of the fluid held within the pressure system. Consequently, it can be difficult to distinguish a drop in pressure caused by the decrease in temperature from a drop in pressure caused by a leak within the pressure system that is allowing the fluid held therein to escape.

To solve this problem of distinguishing the cause of the drop in pressure, operators of pressure systems frequently hold a test pressure within the pressure system for a significant period of time, ranging from 10 minutes to well over an hour, to allow the temperature of the fluid to stabilize and to reach what is essentially or effectively steady-state test pressure (i.e., one in which the test pressure changes very little with time). That is, it may be only after a steady-state pressure is reached that an operator might be assured that a decrease in pressure was a result of the fluid cooling via a transfer of heat from the fluid to the sea and/or other surrounding media rather than because of a leak.

In addition, tests may be repeated several times to rule out various factors that affect the test results, such as how steadily the test fluid is added, mistakes in the test procedure, additional confirmation for assurance, and the like. The result is that significant and, often unnecessary, time is spent performing the leak/pressure tests. A typical series of pressure tests required to test multiple components may often take from 12 to 24 hours to complete, which can become very expensive when, for example, an offshore drilling vessel or rig leases for $800,000 per day. Thus, significant savings in time and money can be made if a more efficient and accurate system and method of detecting leaks is found.

Other methods, including those that require complex integral and differential equations to form mathematical models that better fit observed data, have been proposed to reduce the time it takes to conduct a leak/pressure test. However, these modeling techniques typically rely on the accurate entry of numerous details of the pressure system, meticulous test protocols that must be strictly adhered to, and highly trained personal. Consequently, such methods are not practical and may often be unreliable.

Thus, there exists a need for a system and methods for quickly and accurately performing a leak/pressure test for a pressure system, particularly for a pressure system containing a fluid that demonstrate a significant change in pressure with a change in temperature, that is simple, and does not require complex models or extensive data to solve differential equations.

SUMMARY

It is to be understood that the present invention includes a variety of different versions or embodiments, and this Summary is not meant to be limiting or all-inclusive. This Summary provides some general descriptions of some of the embodiments, but may also include some more specific descriptions of other embodiments.

Embodiments of a leak detection system include a pressure system configured to hold a first volume of a fluid at a first pressure at an initial time, time $t_0$. Optionally, the first volume is zero, i.e., the pressure system holds no fluid (other than ambient air, for example) at time $t_0$ and, therefore, the first pressure is ambient or atmospheric and deemed to be approximately zero. A pressure source such as a fluid pumping unit is coupled to the pressure system, non-limiting examples of which include cementing units, pumps of various types (e.g., centrifugal, duplex, triplex, positive displacement and eductors) all powered by appropriate means (e.g., hydraulic, electric, or any other suitable source of energy to cause a pump to operate), and other devices, such as a syringe or pipette to supply fluid to a pressure system of very small volume that may be found in laboratory equipment, and the like. The fluid pumping unit is configured to supply a selected volume of a test fluid to the pressure system. The volume of test fluid depends, in part, on the size of the pressure system, and can be from small amounts, such as microliters for laboratory equipment, to large amounts, such as barrels and more, for large pressure systems, as might be expected with pipelines and oil wells. Adding the test fluid to the pressure system raises the pressure at which the fluid within the pressure system is confined, such that a test pressure (i.e., the pressure within the pressure system after the test fluid is added) at time $t_1$ is greater than the first pressure at time $t_0$. The test pressure exhibits a change in pressure, such as a decrease in pressure, with time as a temperature of the fluid (both the test fluid and the first fluid) decreases with time. In other words, the test pressure decreases over a time interval time $t_0$ to a time $t_1$ regardless of whether any leaks are present within the pressure system.

Embodiments of the leak detection system also include a computer system and one or more software applications for operation on the computer system, which software applications are configured to accept and store data as a function of time on a computer readable medium, such as a hard drive, flash memory, compact discs, data tapes, and the like. At least one pressure sensor is in fluid communication with the pressure system and in electrical communication with the computer system. The pressure sensor is configured to sense the first pressure at time $t_0$ and the test pressures at time $t_1$, at time $t_2$, to a time $t_{(n+1)}$, and transmit a signal reflective of the first pressure and the test pressures at each of the times to the computer to be stored on the computer readable medium.

Embodiments of the leak detection system also include a software application on the computer system configured to calculate a leak detection value, which is a function of a variance of a percentage or absolute change in pressure over time, such as the percentage/absolute change in a difference in the first pressure at time $t_0$ and the test pressure at time $t_1$; the test pressure at time $t_1$ and the test pressure at time $t_2$; and so on, for a given plurality of intervals of time 'n' to a test pressure at the time$_n$ and the test pressure at the time $t_{(n+1)}$. A benefit of this method is its relative simplicity and accuracy and that it does not require complex formulas or equipment to use.

Embodiments of the leak detection system also include a graphical output coupled to the computer system. The graphical output is configured to display the leak detection value as a function of time. Examples of the graphical output include monitors, printouts generated by a printer, web pages that have had the leak detection value transmitted to them via a server or other internet connected coupled to the computer system, dedicated displays and/or dumb terminals, and the like.

Embodiments of the leak detection system further include a software application for operation on the computer system which is configured to form a schematic illustration or image representative of the pressure system, with the schematic illustration including fluid control symbols which mirror the fluid control components in the pressure system, and which components, in turn, are operable to form a plurality of fluid pathways. Each fluid pathway is separately pressurizable and can include one or more testable fluid control components which are in common with another separately pressurizable fluid pathway. The computer system is further configured to receive pressure data from the pressure sensor, to store the pressure data from a first fluid pathway for a first period of time when pressurized by the source of pressurized fluid to a first test pressure, to store pressure data from a second fluid pathway for a second period of time when pressurized by the source of pressurized fluid to a second test pressure, and to indicate a suitability of the testable fluid control component for maintaining a pressure if either the first fluid pathway passes pressure testing or the second fluid pathway passes pressure testing, or if the first fluid pathway passes pressure testing and the second fluid pathway compares within a predetermined limits to the first fluid pathway's pressure response.

Methods of using the above described system to detect leaks are also disclosed.

Various embodiments of the present inventions are set forth in the attached figures and in the Detailed Description as provided herein and as embodied by the claims. It should be understood, however, that this Summary does not contain all of the aspects and embodiments of the one or more present inventions, is not meant to be limiting or restrictive in any manner, and that the invention(s) as disclosed herein is/are and will be understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

To further clarify the above and other advantages and features of the one or more present inventions, reference to specific embodiments thereof are illustrated in the appended drawings. The drawings depict only typical embodiments and are therefore not to be considered limiting. One or more embodiments will be described and explained with additional specificity and detail through the use of the accompanying drawings in which:

FIG. 17 is an illustration of a summary test report, in accordance with another representative embodiment;

FIG. 19 is an illustration of a coverage test report, in accordance with another representative embodiment.

Figure 1:
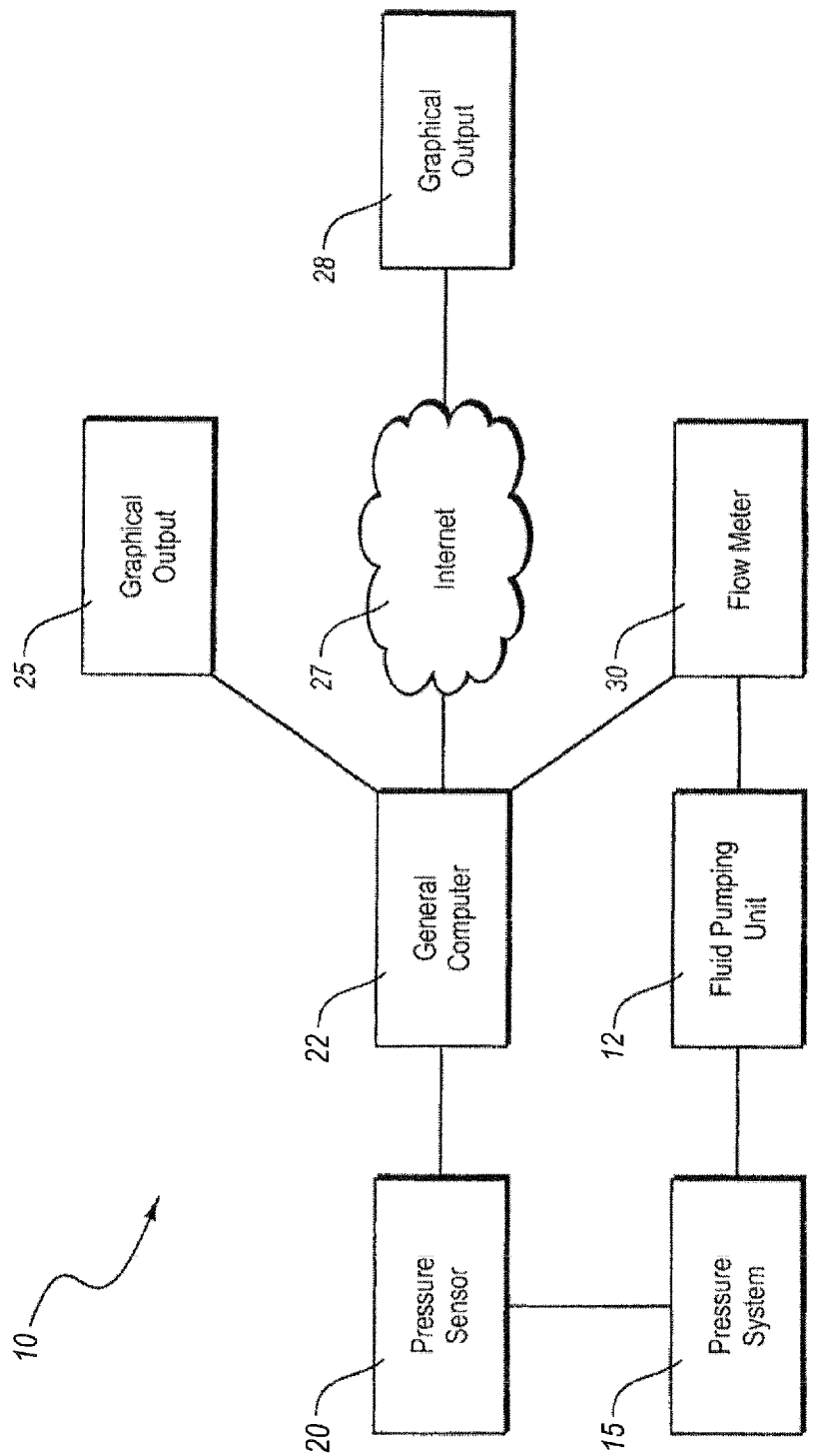
FIG. 1 is a block diagram of a leak detection system for a pressure system, in accordance with a representative embodiment of the present invention.

The drawings are not necessarily to scale.

DETAILED DESCRIPTION

The following Detailed Description makes reference to the accompanying drawings, which form a part thereof and in which are shown, by way of illustration, various representative embodiments in which the invention can be practiced. While these embodiments are described in sufficient detail to enable those skilled in the art to practice the invention, it should be understood that other embodiments can be realized and that various changes can be made without departing from the spirit and scope of the present invention. As such, the Detailed Description is not intended to limit the scope of the invention as it is claimed, but rather is presented for purposes of illustration, to describe the features and characteristics of the representative embodiments, and to sufficiently enable one skilled in the art to practice the invention. Accordingly, the scope of the present invention is to be defined solely by the appended claims.

Furthermore, the following Detailed Description and representative embodiments of the invention will best be understood with reference to the accompanying drawings, wherein the elements, components and features of the embodiments are designated by numerals throughout.

DEFINITIONS

In describing and claiming the present invention, the following terminology will be used.

As used herein, a Blowout Preventer (BOP) is a component used to control wellbore pressure during a high-pressure event. Different types of blowout preventers include annular BOPs which are designed to close on any size of drill pipe, pipe ram BOPs which are designed to close on a specific size range of drill pipe, variable-bore pipe ram BOPs which are designed to close about an extended range of drill pipe sizes, shear ram BOPs which are designed to shear the drill pipe, and blind ram BOPs which are designed to close and seal the hole when there is no drill pipe within the BOP.

As used herein, a Blowout Preventer Stack (BOP Stack) is a group of BOP components, such as the rams and annulars described above, that are assembled together in series and mounted to the top of a wellbore.

As used herein, a manifold is a set of valves and the tubular (e.g. piping) connections between them which are used to direct the movement of fluids and to manage pressure.

As used herein, a choke manifold is a manifold located on drilling rig or vessel which is connected to the subsea BOP stack through choke and kill lines.

As used herein, a schematic illustration is a diagram or image of a set of fluid control components in the pressure system, which in the case of a BOP stack piping system includes the choke manifold, the BOP stack, the choke line, the kill line, the fluid pumping units, the various valves and the piping connections between them.

As used herein, a sub-system is a selected set of connected components in the pressure system which has been selected for testing a specific fluid pathway within the overall pressure system.

As used herein, a fluid control component, also referred to as a component, is one item in the schematic illustration that maps to a pressure-containing item in the pressure system, such as a valve, a BOP, a choke, a vessel or container, a rigid pipe, a flexible hose, etc.

As used herein, a test plan is the planned sequence of tests which incorporates each of the fluid control components in the pressure system to be pressure tested.

As used herein, a plan step is one test within the set of tests comprising the test plan.

As used herein, a test step is a plan step when it is being executed. Certain fluid control components are closed and the pressure is brought up to a designated value. If pressure holds and no leaks are detected, the test step passes.

As used herein, a test diagram is an illustration or image derived from the schematic illustration for the pressure system showing the valve/ram states, as well as indicating the resultant fluid pathways (e.g. pressure and bleed) through the system.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, and A, B and C together.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition even through trace amounts may remain.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

EMBODIMENTS

Illustrated in FIGS. 1-19 are several representative embodiments of a system and method for detecting leaks in a pressure system, including but not limited to a pressurized vessel or a pressurized piping system having multiple fluid pathways, etc. As described hereinbelow, the system and method for detecting leaks provides several significant advantages and benefits over other devices and methods used for leak detection. However, the recited advantages are not meant to be limiting in any way, as one skilled in the art will appreciate that other advantages and uses may also be realized upon practicing the present invention.

A block diagram of one representative embodiment of the leak detection system 10 is illustrated in FIG. 1. The leak detection system 10 includes a pressure system 15. Tubes, valves, seals, containers, vessels, heat exchangers, pumps, pipelines, conduits, and other similar fluid control components, are typically configured to retain and/or transport fluids within these items. For purposes of this application, these different components are referred to as a pressure system 15 and comprise one or more of the above components and their equivalents and, optionally, other components.

For example, one non-limiting example of the pressure system 15 includes a pipeline for transporting natural gas or other hydrocarbons or other fluids. Another example is a natural gas or oil well, $CO_2$ well, water well, disposal well and the like, whether being actively drilled or already producing, that typically includes one or more of the following components: a Christmas tree or well head; production tubing; casing; drill pipe; blowout preventers; and other components in the fluid system necessary or appropriate for use in a oil well drilling or production system, as well as the sub-components of each of those items that optionally can be hydraulically isolated and individually tested, and, in some instances, can include the open hole (i.e., uncased) wellbore and the surrounding rock or geological formation. Yet another non-limiting example includes hydraulic and fuel lines of various types for transporting fluids for use in mechanical devices. Yet another non-limiting example includes storage containers for retaining fluids therein. Other pressure systems for transporting or retaining fluids fall within the scope of the disclosure.

The fluids retained or transported within embodiments of the pressure systems 5 typically include one or more gases, liquids, or combinations thereof, including any solid components entrained within the fluid. As one non-limiting example, a typical fluid comprises one or more of natural gas, carbon dioxide, hydrogen sulfide, natural gas liquids, and the like. Another example is crude oil, which typically includes methane, propane, octane, and longer-chained hydrocarbons, including heavy oil/asphaltenes. In example of an exploration oil or gas well, the fluids typically include drilling fluids, lost circulation materials, various solids, drilled formation solids, and formation fluids and gases. Yet another example is hydraulic fluid within a hydraulic line. Other examples of such fluids include test fluids specifically chosen for the test, including, but not limited to, viscosified water. Other fluids, whether liquid or gas, fall within the scope of the disclosure.

A pressure source, such as fluid pumping unit 12, is an optional component of the leak detection system, non-limiting examples of which include cementing units, pumps of various types (e.g., centrifugal, duplex, triplex, positive displacement, eductors) powered by any suitable source of power such (e.g., hydraulic, electric, mechanical). The fluid pumping unit 12 is coupled to the pressure system 15. The fluid pumping unit 12 is configured to supply a sufficient volume of pressurized test fluid from a source or reservoir of fluid to the pressure system 15. The test fluid, as noted, optionally is selected specifically for the test, such as viscosified water, or a fluid of the type already present in the pressure system 15, or other combinations thereof. The selected volume of test fluid depends, in part, on the size or total volume of the pressure system 15, and can be from small amounts, such as microliters for laboratory equipment, to large amounts, such as barrels (i.e., 42 gallons per barrel) and more, for large pressure systems, as might be expected with pipelines and oil and gas wells. Adding the test fluid to the pressure system 15 raises the pressure at which the fluid within the pressure system 15 is confined, such that a test pressure (i.e., the pressure within the pressure system after the test fluid is added to the pressure system) at time $t_1$ is greater than the initial pressure of the fluid in the pressure system 15 at time $t_0$.

Optionally, a flow meter 30, such as a venturi flow meter, pressure flow meter, stroke counter (calibrated to the volume/stroke of a given positive displacement pump), impeller flow meters, and the like and as appropriate, are coupled to the fluid pumping unit 12 to sense the amount of fluid being added to the pressure system 15. The flow meter 30 optionally displays a signal reflective of the flow of the fluid, such as a flow rate and/or total volume pumped, via gauges and/or digital displays. The flow meter 30 optionally transmits a signal reflective of the flow rate to a computer system 22, typically via sensor cables. While FIG. 1 shows the flow meter transmitting a signal via sensor cables, it is contemplated that the flow meter 30 can be configured to transmit the signal wirelessly and even to be connected to the Internet for transmission to a remote computer system 22 configured to receive wireless and/or Internet signals.

The leak detection system 10 also includes at least one pressure sensor 20 coupled to the pressure system 15. The pressure sensor 20 is configured to sense an initial or "test" pressure of the fluid within the pressure system 15 at an initial time $t_0$ as well as at subsequent times over an interval 'n' of time out to time $t_{(n+1)}$. The pressure sensor 20 optionally displays a signal reflective of the pressure of the fluid within the pressure system 15, via gauges and/or digital displays. The pressure sensor 20 transmits a signal reflective of the pressure to the computer system 22, typically via sensor cables, although it is contemplated that the pressure sensor 20 can be configured to transmit the signal wirelessly. Of course the signals can be sent through a hard wired system, a wireless system, or by other suitable means such as through the Internet to the computer system 22 if it is so configured.

The pressure sensor 20 is typically selected for the particular operating conditions, such as a pressure and temperature range that is expected for the fluid within the pressure system 15. For example, a pressure sensor 20 selected for use in a pressure system that is part of an oil well, such as a blowout preventer, would be capable of sensing pressure in a range from 0 to 15,000 pounds per square inch and rated for temperatures in the range of −40° F. to +250° F. A non-limiting example of such a pressure sensor 20 include the Models 509, 709, and 809 Pressure Transducers available from Viatran, a Dynisco Company, of Grand Island, N.Y. Other pressure sensors 20 suitable for the pressure and temperature conditions expected to be encountered within the pressure system 15 also fall within the scope of this disclosure.

In some embodiments a fluid temperature measurement can be combined with the fluid pressure measurement, either using an enhanced version of the pressure sensor 20 which has been modified to included a temperature sensor, or through a temperature sensing device that is altogether separate from the pressure sensor but also in electrical communication with the computer system 22.

As stated above, the leak detection system includes a computer system 22, such as a general purpose computer. The computer system 22 can include laptop computers, desktop computers, netbook and tablet computers, personal digital assistants, calculators (programmable and otherwise), and other similar devices and can be located at the testing site or remote from the site. The computer system 22 can included an operating system and one or more software applications for operation on the computer system, which software applications can be configured to accept and store data reflective of the test fluid pressure, temperature, flow rate and/or volume captured during a test step, and to manipulate and present that data as a function of time on a computer readable medium, such as a hard drive, flash memory, data tapes, jump drives, remote storage, such as cloud computing with a data server or servers, and the like and for further delivery to the user in a suitable visual/readable format. Optionally, the computer system 22 is configured to receive and transmit data wirelessly or over an Internet connection 27 that is, in turn, connected to another graphical output 28 and/or computer system described in further detail below.

Other embodiments of the leak detection system include a computer system 22, such as specific purpose computer, that can be configured to process the signals from the pressure sensor 20 and the flow meter 30 reflective of the test fluid pressure, temperature, flow rate and volume, rather than a general purpose computer. The specific purpose computer can have an operating program recorded onto a specific instruction computer chip, such as a programmable read only memory, externally programmable read only memory, externally erasable programmable read only memory, and/or hardwired into a specific instruction computer chip.

Embodiments of the software application as will be described in further detail below are configured to calculate a leak detection value, which is a function of a variance of the first pressure at time $t_0$ and the test pressure at time $t_1$; the test pressure at time $t_1$ and the test pressure at time $t_2$; and so on for given one and/or more intervals of time 'n' to a test pressure at the time$_{n+1}$ and the test pressure at the time $t_{(n+1)}$. A benefit of this previously unknown method is its relative simplicity and accuracy.

Embodiments of the leak detection system 10 also include a graphical output 25 coupled to the computer system 22. The graphical output 25 is any suitable device configured to display to the user the temperature and pressure data, as well as the leak detection value as a function of time, such as a chart or graph. Non-limiting examples of a suitable visual include scatterplots, line graphs, and circular chart recorders that emulate analog circular chart recorders. Examples of the graphical output include monitors, printouts generated by a printer, web pages that have had the leak detection value(s) transmitted to them via a server or other Internet connection coupled to the computer system 22, or any other kind or type of dedicated display and/or dumb terminals.

As mentioned above, the test pressure exhibits a change in pressure with time as an effect of a temperature of the fluid (both the test fluid and the first fluid) changes with time. In other words, the test pressure changes over a time interval time $t_0$ to a time $t_{(n+1)}$, regardless of whether a leak or leaks are present within the pressure system, and often changes at an exponential rate. This effect is particularly noticeable with synthetic fluids composed of long chain hydrocarbon molecules that are compressible to a modest degree under pressure. The net effect is that it can be difficult to determine quickly whether a decrease in pressure is caused by a leak or caused merely by the decrease in pressure as the drilling fluid cools and the thermal compression effect lessens. As a result, and as will be illustrated, it is a typical practice to hold the pressure system at an elevated pressure for extended periods of time until a steady state pressure has been reached. In other words, the temperature and, hence, the pressure of the fluid within the drilling system has reached a relatively constant steady state.

In large pressure systems, such as pipelines and oil or gas wells, it might take more than an hour for the pressure system to reach a steady state pressure before regulations for testing such systems are satisfied. It should be noted that it is presently understood that existing regulations do not require the tests to occur for such extended period, only that the uncertainty caused by the temperature and compressibility effects cause operators to extend the period of the test to ensure a valid reading the satisfies regulations. As a result, it has been observed that significant time is wasted that might otherwise be avoided if a test were available that could quickly evaluate the pressure system and account for the temperature and compressibility effects without need for elaborate models, complex algorithms, detailed and strict test plans, and the like.

A software application for the computer system 22 (or operating program hardwired on a silicon chip in a specific computer), can utilize an equation as follows:

$$\text{Leak Detection Value} = \left(1 - \frac{\text{Pressure}_{time0}}{\text{Pressure}_{time1}}\right) \times 100$$

It will be understood that multiplying the value by 100 creates a value greater than one, rather than a decimal value less than one, and, therefore, is optional depending on a user's preference. From the above, it can be seen that the leak detection value is a function of the variance of a pressure of a fluid in the pressure system plus the additional, selected volume of the test fluid added to the pressure system at first time $t_0$ and the pressure at a second time $t_1$. The computer system reads these values as stored in the computer readable medium, which were previously sent by the pressure sensor. Of course, it will be understood that the software application can read the data and calculate the leak detection value (LDV) nearly simultaneously with the measurement of the pressure by the pressure sensor or, in other words, in real-time. Once an initial leak detection value is calculated it can be stored in the computer readable medium for future use and recall, such as being including in a graphical display or being used in additional calculations. The leak detection value is then calculated for subsequent time intervals and test pressures, such as at time $t_2$ and at time$_3$ and through the test pressure at the time$_n$ and at time $t_{(n+1)}$, the test pressures at each of those times typically exhibiting a pressure lower than that in the immediately preceding periods and exhibiting an exponential rate of decease (within the limits of error and noise in the measurement of the test pressure by the pressure sensor).

The time interval at which the test pressure is sensed or measured typically occurs over a relatively short period of time, such as every 3 seconds, 15 seconds, 30 seconds, 60 seconds and the like. Of course, other intervals of time may be selected and fall within the scope of the disclosure, including intervals less than a second and up to about or around 30 minutes. Shorter periods typically work better for test pressures that decrease exponentially, particularly if there is a sharp temperature gradient between the fluid within the pressure system and the temperature of the ambient environment surrounding the pressure system. It is contemplated that the test pressure data acquired and stored in the computer readable medium optionally undergoes some form of data smoothing or normalizing processes to eliminate spikes or data transients. For example, one may use procedures to perform a moving 3-point average, curve fitting, and other such data smoothing techniques, prior to using it to calculate a leak detection value. This allows for a smoother and, potentially, more readable and accurate representation of the leak detection value with less noise from interference and spurious signals.

In another embodiment of the system and method for detecting leaks in a pressure system described herein, the software application for the computer system 22 (or operating program hardwired on a silicon chip in a specific computer), can measure the rate-of-change of the pressure within the pressure system, and then utilize this value to calculate the leak detection value (LDV).

Embodiments of the method include providing the components described above, namely, a pressure system 15, a fluid pumping unit 12, a computer system 22, at least one pressure sensor 20, and a graphical output 25, as described above, and, optionally, an Internet or wireless connection 27 connected to another graphical output 28, and a flow meter 30 coupled to the fluid pumping unit 12.

Figure 7:
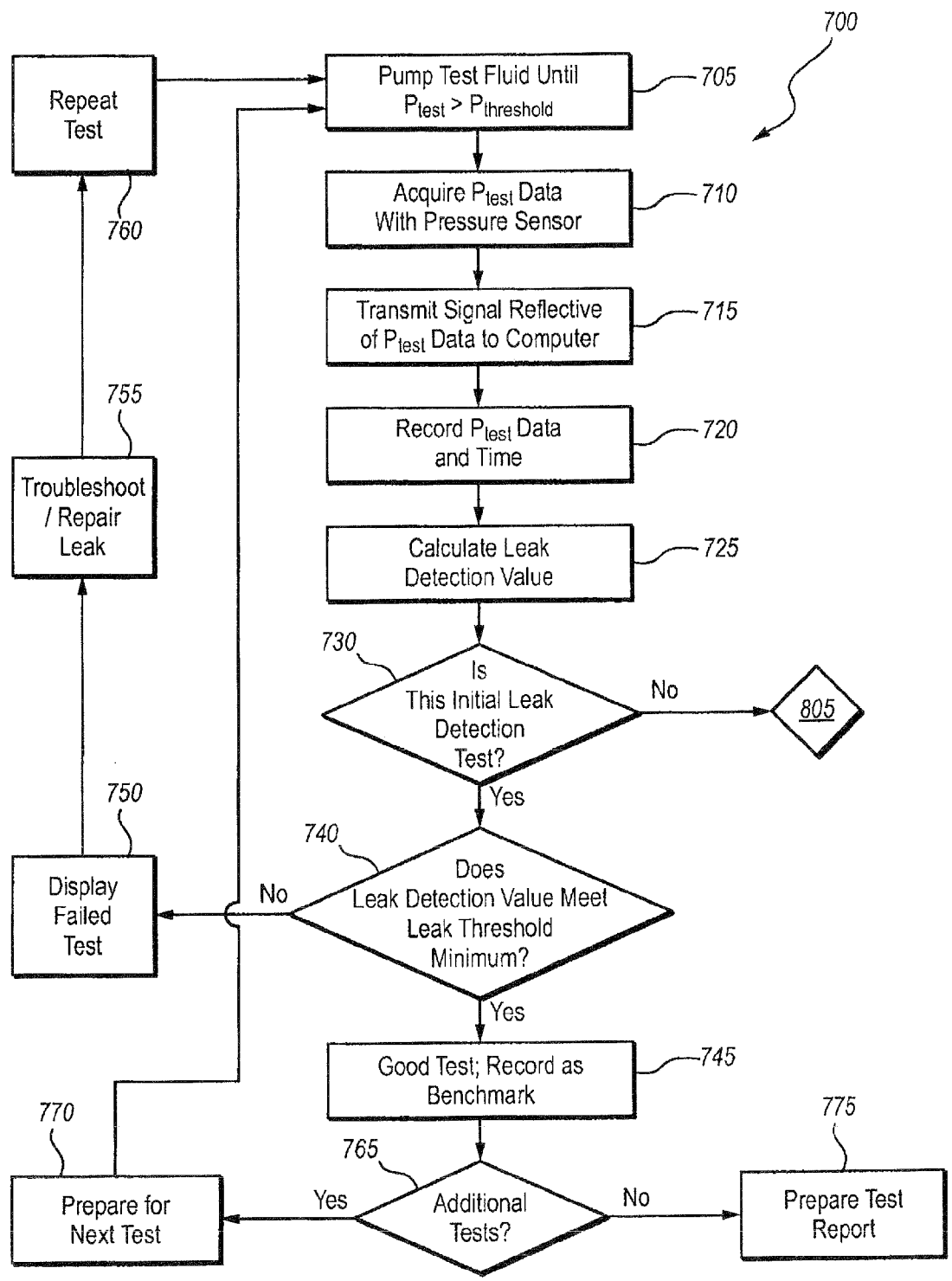
FIG. 7 is a flow chart depicting a method of detecting leaks in a pressure system, in accordance with another representative embodiment.
Figure 8:
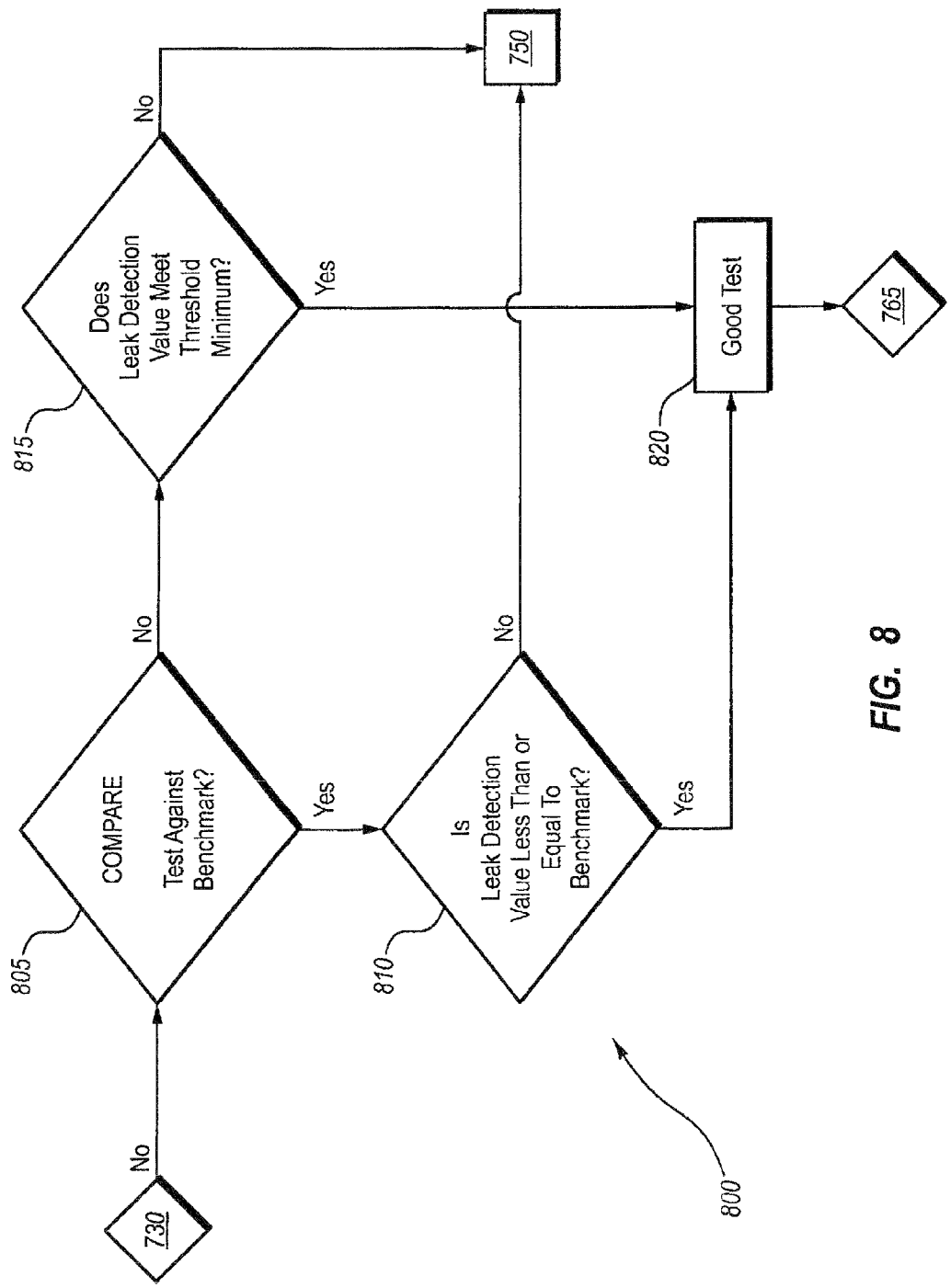
FIG. 8 is a continuation of the flow chart in FIG. 7 depicting a method of detecting leaks in a pressure system, in accordance with another representative embodiment.

To conduct a leak detection test and calculate the leak detection value, reference is made to the flow charts 700 and 800 in FIGS. 7 and 8. The fluid pumping unit 12 is coupled to the pressure system 15 so that the fluid pumping unit 12 can pump or introduce a sufficient volume of test fluid into the pressure system 15, as represented at box 705 in FIG. 7, such that fluid within the pressure system 15 is at test pressure, or $P_{test}$, that is at or above a minimum pressure threshold, or $P_{threshold}$. The pressure system should maintain $P_{test}$ without leaking. It is understood that the pressure system 15 may already have a volume of fluid at an initial pressure below a test pressure within the pressure system 15 and, therefore, the pressure system 15 requires only an additional, small amount of test fluid to be added. Alternatively, the fluid pumping unit 12 is capable of filling the pressure system 15 in its entirety to its test pressure.

Optionally, as the fluid pumping unit 12 is pumping the test fluid into the pressure system, the flow meter 30 senses the flow rate and/or determines the volume of the test fluid pumped into the pressure system 15 and transmits a signal reflective of those values to the computer system 22 for recording and storage on the computer readable medium, typically with an associated time stamp or other data. Optionally, if the flow rate is sensed or detected and transmitted to the computer system 22, the computer system 22 can be configured to calculate the total volume pumped. Other methods to determine flow rate and/or volume include the use of simple analog or digital stroke counters connected to the fluid pumping unit 12, from which the flow rate and the volume of test fluid pumped can be calculated in the computer system. The flow rate and the total volume of the test fluid can also be displayed on the graphical output 25, along with other optional data.

The pressure sensor 20 can sense the pressure of the fluid within the pressure system 15 and transmit a signal reflective of the pressure to the computer system 22 before, during, and after the fluid pumping unit 12 pumps the test fluid into the pressure system 15, as represented at boxes 710, 715, and 720. The software application can be configured to automatically and/or continuously record on the computer readable medium the pressure data (and other data as discussed above) once a certain threshold value is reached, such as a minimum pressure, flow rate, volume pumped, and the like, or continuously. Alternatively, it is contemplated that a user manually starts the program and/or instructs it to begin recording the data upon entering a command to do so. As previously noted the pressure data (and other data) may be averaged, normalized and/or smoothed prior to displaying and/or using it to calculate the leak detection value. The data optionally is displayed on the graphical output 25 or transmitted wirelessly and/or through an Internet connection 27 to another graphical output 28.

The software application calculates the leak detection value in accordance with one of the formulas described above for a selected time interval, as noted at box 725. In one embodiment, the computer can be configured to continuously calculate and/or recalculate a leak detection value that is the variance of the test pressure at time 0 and the test pressure at time 1 subtracted from unity and multiplied by 100 to generate a leak detection signal reflective of the leak detection value. In another embodiment, the leak detection value is a function of a variance of the test pressure at time $t_1$ and the test pressure at time $t_2$; the test pressure at time $t_2$ and the test pressure at time$_3$; through the test pressure at the time$_n$ and the test pressure at the time $t_{(n+1)}$. The leak detection values may also be smoothed, such as by averaging (e.g., 3-point moving average), curve fitting, normalizing techniques, continuous averaging techniques and/or otherwise smoothed. The leak detection values optionally are recorded to the computer readable medium, typically with an associated time stamp. In addition, the leak detection values are optionally displayed as raw data and/or as a graphical plot or chart on the graphical output 25.

Step or box 730 requests a decision for the question of whether this is the initial leak detection test conducted on the pressure system 15. If it is the initial leak detection test, measurements of the test pressure typically are taken for a selected period of time, such as five, ten, fifteen minutes, or longer, depending on the pressure system 15, to ensure a valid test and to characterize the pressure decrease and the leak detection value as a function of time. In other words, the selected volume of test fluid is held within the pressure system 15 until the test is concluded and the additional fluid and/or pressure introduced into the pressure system to conduct the test is bled off or released.

If the decision at box 730 of FIG. 7 is "No", and this is not the initial leak detection test, then the decision as to the significance of the calculated leak detection value is determined using the flow chart 800 in FIG. 8 and, more specifically, box 805, which is discussed in detail below.

If the decision at box 730 is "Yes", i.e., this is the initial leak detection test, then the process proceeds to box 740. In this step, the computer system 22 is configured to determine whether the leak detection value calculated in box 725 meets a certain leak threshold or criteria that is preset by the user. For example, it might be that a leak detection value of less than ±0.1 or ±0.2 (the leak detection value is a unitless indicator) indicates a valid test. That is, any decrease in the pressure of the pressure system 15 as measured by the pressure sensor 20 during which the test fluid is being pumped or held within the pressure system 15 is typically the result of the temperature and compressibility effects of the fluid rather than an indication of a leak within the pressure system 15. To avoid dealing with the confusion of negative numbers, the leak detection value can be manipulated so that it will always be a positive number. Thus the leak detection value can be multiplied by a coefficient or other factor, to always output a positive value (such as by multiplying any negative results by −1), for example. Other manipulation of the leak detection value falls within the scope of disclosure. Further, other thresholds for the leak detection value may be selected depending upon the type of pressure system 15 being tested. For example, laboratory equipment that uses very small volumes of fluid might have a lower leak threshold value, such as 0.05 because the effect of the temperature gradient on such small volumes is proportionally greater. This threshold value can be observed on a plot or chart with a display of the calculated leak detection values as output on the graphical display, or it may be a simple pass/fail type display, or other similar type of output. Preferably the values are displayed graphically.

If the leak detection value meets the leak threshold value, i.e., box 740 is answered "Yes", box 745 indicates that software application records this as a good test and the leak detection values are recorded as a benchmark by which future leak detection tests of the same or similar components are evaluated.

In the next step 765, the method operates to determine whether there are additional leak detection tests to be conducted on the pressure system 15, such as when testing individual components of a pressure system 15 that are capable of being hydraulically isolated from other components of the pressure system 15. An example of such an instance is the testing of a BOP stack on an oil well, as a BOP stack typically includes one or more annular rams and one or more pipe, blind, and/or shear rams, each of which can be hydraulically isolated and tested separately from the other components of the BOP stack.

If no additional tests are contemplated, a leak detection test report, such as a summary of the data, the outcome of the test or tests, and associated graphs and/or plots can be prepared for storage on the computer readable medium and/or output via the graphical display, whether on-screen or as a hard copy printed out, and/or transmitted either wirelessly or via the Internet to another graphical display. This step is indicated at box 775.

If additional leak detection tests are contemplated, indicated as box 770, preparations for the next test are made and the process begins anew, as indicated at box 705.

Turning back to box 740, if the leak detection value does not meet the leak threshold requirements for a passed test, i.e., the leak detection value indicates that a leak is present or some other factor is causing the pressure system 15 to lose pressure more rapidly than can be accounted through temperature and compressibility effects, then the decision turns to box 750 that notes to display "Failed Test." This failure can be observed on a plot or chart with a display of the calculated leak detection values as output on the graphical display, or it may be a simple pass/fail type display, or other output that provides an indication perceivable or detectable by the user. Typically, the failure is also recorded in the computer readable medium so that the result optionally can be recalled and compared to leak tests that occurred previously, perhaps weeks and months ago or even longer. Of course storage in the memory allows for comparison with tests that occur in the future.

Box or step 755 indicates that the source of the leak or the cause of the loss of pressure is trouble shot and/or repaired, with the leak detection test repeated at step 760, as indicated by the return to the beginning of the method at box 705.

Turning back to the decision at step 730, i.e., whether this is the initial leak detection test, if the answer is "No" the method then proceeds to decision or diamond 805 as indicated on the flow chart 800 in FIG. 8. As this particular test is a subsequent test, i.e., not the initial leak detection test, decision step 805 compares the leak detection value with or against the initial leak detection values stored as a benchmark in step 745.

When the leak detection value is compared against the benchmark and produces a result where the leak detection value is less than or equal to the benchmark, the computer system produces a result that is displayed or communicated to the user indicating that the test was good at step 810. It should be noted that typically subsequent tests will be compared against the validated benchmark, although it is not required to be so compared. In addition, comparing subsequent tests to a validated benchmark typically results in time savings, as the additional test fluid and/or elevated test pressure is then typically held for a shorter period of time, such as 5 minutes, as compared to the time that the test fluid and/or elevated test pressure is held during the initial or benchmark test. If the calculated leak detection value is less than or equal to the benchmark and/or within a certain amount of the benchmark, the test is declared passed at box 820, which then points to decision box or step 765 in which it must be determined if more tests are to be performed as previously described. If the leak detection value at decision step 810 falls outside the range of acceptable values as compared to the validated benchmark, then the method returns to step 750 as previously described.

Other methods of comparing subsequent leak detection values to the initial or validated benchmark leak detection values include comparing an average leak detection value across the entire time interval for a given series of multiple tests, and subtracting that average from the average value of a specific test over the same interval. Another option is to subtract the leak detection values of the benchmark test at a specific time interval from the subsequently calculated leak detection value of another test at the same time interval. Other methods of manipulating and displaying the leak detection values fall within the scope of the disclosure.

Instead of comparing the leak detection values to a validated benchmark as described in step 810, the leak detection values optionally can be compared to the leak threshold, as noted at decision step or box 815, which is similar to box 740. If the leak detection value meets the leak threshold, a good test and the flow chart also directs towards step 820. If the leak detection values do not meet the leak threshold, the method returns to step 750 as previously discussed.

Several examples of the system and method of leak detection will be described below and with reference to FIGS. 2-6. The examples refer to data acquired at a well site, in particular, a deepwater exploration well in which the subsea BOP stack and, more specifically, the various fluid control components forming the BOP stack that can be hydraulically isolated from the other components, are tested for leaks and pressure integrity to satisfy regulations. It should be noted that while the various examples provided herein relate to BOP stacks and to oil and gas drilling, the scope of the disclosure can be extended to other types of pressure systems, including those described above.

Figure 2:
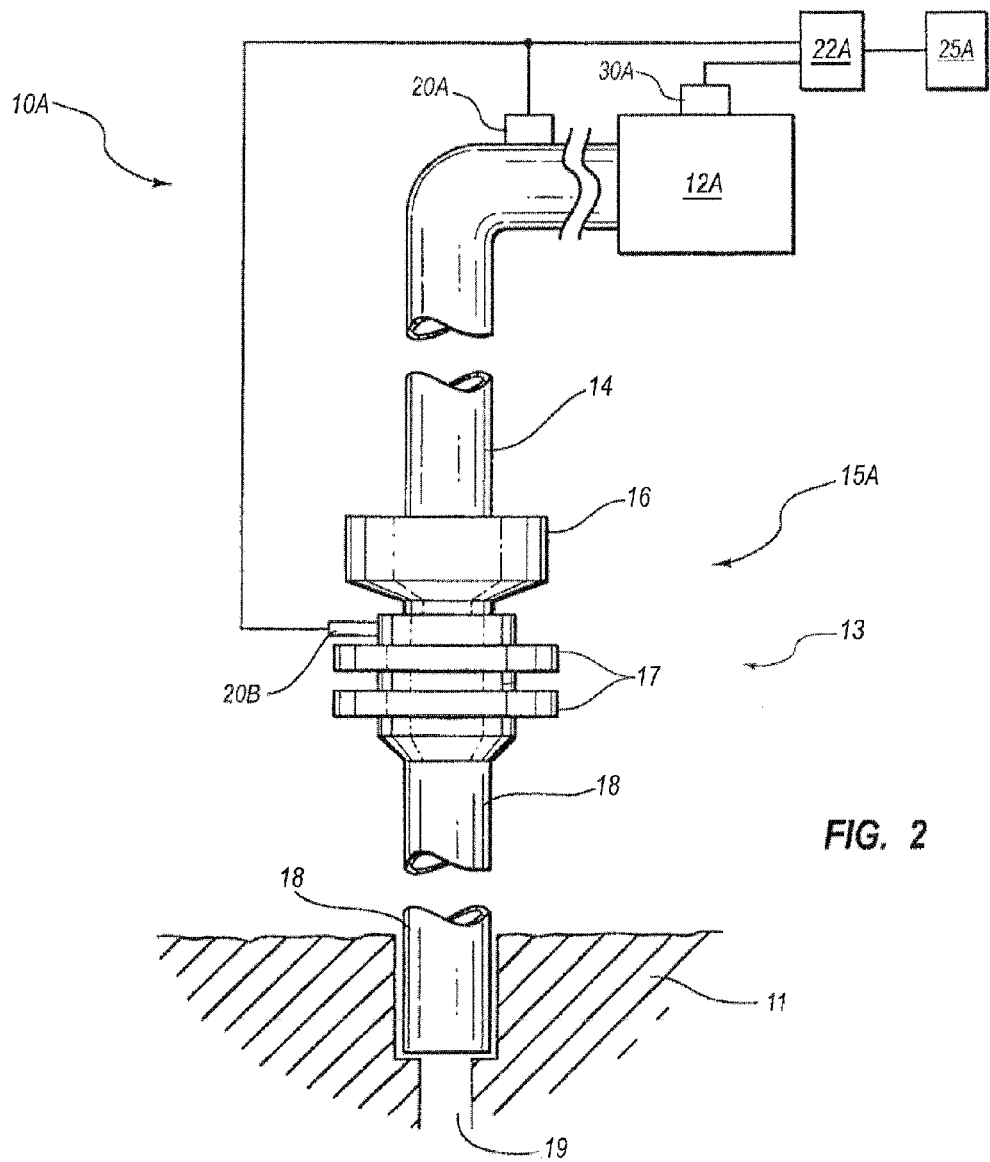
FIG. 2 is a drawing of the leak detection system configured to test a blowout preventer stack ("BOP stack") on an oil rig, in accordance with another representative embodiment.

FIG. 2 is a representation of an embodiment 10A of the leak detection system for a pressure system 15A that includes, in this example, flow line 14 (which may be one or more flow lines) that are configured to couple a fluid pumping unit 12A, typically a cementing unit when on a drilling rig, to one or more annular rams 16 and one or more shear rams and/or pipe rams 17 included within a subsea BOP stack 13 of an offshore oil rig. Additionally, while the examples presented herein do not extend to testing the following elements of the exploration well, FIG. 2 also illustrates the casing 18, open wellbore 19, and the formation or geological structure/rock 11 that surrounds the open wellbore 19. As previously noted, the method and system described herein can be extended to these elements for leak detection and pressure integrity testing if so desired.

Also illustrated in FIG. 2 is a flow meter or flow sensor 30A in electrical communication with a computer system 22A that includes an operating system, one or more software applications and computer readable medium, as previously described. Also illustrated are two pressure sensors 20A and 20B which can be coupled to the pressure system 15A, one at the surface near the pumping unit 12a and one at the subsea BOP stack 13. Other pressure and/or sensors may be located at the same or different locations of the pressure system 15A and fall within the scope of the disclosure. The pressure sensors 20A and 20B are also in electrical communication with the computer system 22A, as is the graphical output 25A.

Example 1

Figure 3:
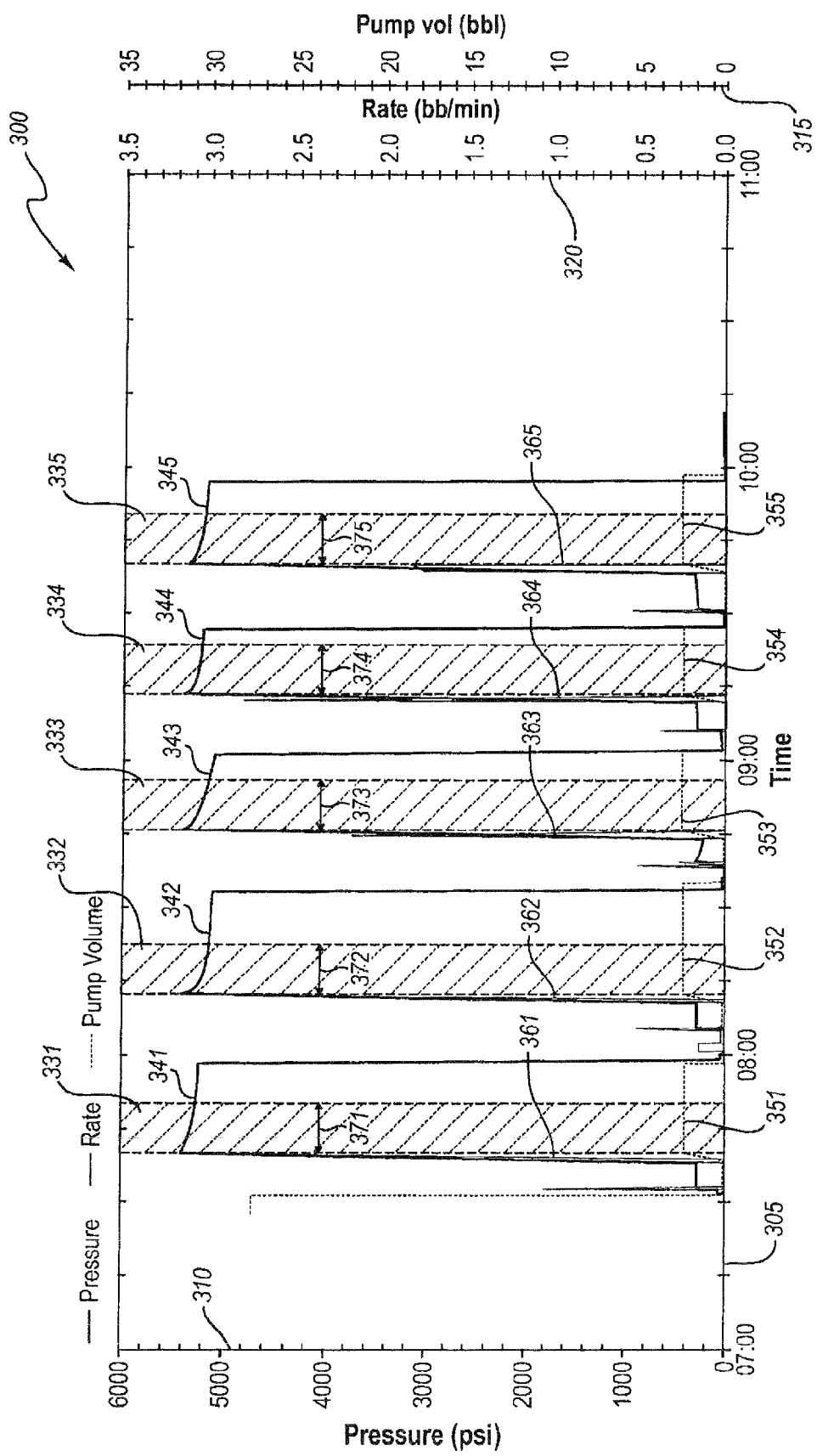
FIG. 3 is a plot of test data captured by the leak detection system, in accordance with another representative embodiment.

Pressure, flow rate, and the volume of test fluid pumped are graphed on the chart 300 in FIG. 3, which illustrates a series of high pressure tests to the several fluid control components of the BOP stack 13 illustrated in FIG. 2. It is likely that some of the BOP components are the same type so that the volume pumped for the test of such components will be effectively the same, as will be explained below. For example, a typical BOP stack 13 can include several pipe rams 17, each of which must be hydraulically isolated and tested separately in accordance with regulations. The pipe rams 17 are typically identical from an enclosed volume standpoint, so that the volume of fluid pumped to the different pipe rams will be similar, leading to similar test results if there are no leaks or defects. Other components of the BOP stack that optionally can be tested with the methods and systems described herein include, but are not limited to, the choke manifold, the choke line and the kill line.

The abscissa (e.g., horizontal axis), is the time axis 305, which shows or plots time on an hourly basis, with the gradations marking fifteen minute increments. The left vertical or ordinate axis is a pressure axis 310 showing the pressure of the pressure system 15 (FIG. 1) as measured by the pressure sensor 20, and includes increments or gradations for every 1,000 pounds per square inch (psi) with minor gradations marking 200 psi increments. The right ordinate is also known as the flow rate axis 320 and presents the rate at which the test fluid is pumped by the fluid pumping unit 12 (FIG. 1) as measured by the flow sensor 30 and/or as calculated by the software application as noted above. The flow rate axis 320 has major gradations for every 0.5 barrels per minute (bbl/min), or 21 gallons per minute, with minor gradations for every 0.1 bbl/min. The right ordinate axis is also called the test fluid volume axis 315 and shows the total test fluid volume pumped by the fluid pumping unit 12 as measured by the flow sensor 30 and/or as calculated by the software application as noted above. The test fluid volume axis 315 has gradations for every barrel and minor gradations for every 0.2 barrels of total volume of test fluid pumped.

Five separate leak detection tests, 331, 332, 333, 334, and 335 are plotted on the chart 300 typically on the graphical display 25 (FIG. 1). Test 331 output includes the ordinate pressure test axis 310 to present the measured/sensed pressure 341 against the time axis 305. Also, the measured/calculated test fluid volume 351 is plotted over time using the time axis 305 against the test fluid volume axis 315. The test fluid flow rate 361 read against the flow rate axis 320, and the time (time $t_0$ to time $t_{(n+1)}$) over which the leak detection value for test 331 is calculated as indicated by span 371. In other words, the span 371 indicates the time interval time $t_0$ to time $t_{(n+1)}$ over which the leak detection value is detected, with the initial time $t_0$ occurring at the start of the span 371, the span 371 being divided into the various intervals to time $t_{(n+1)}$. This process, as discussed above and illustrated in FIGS. 7 and 8, is repeated for each test.

Test 332 includes the measured/sensed pressure 342 read against the pressure axis 310 versus the time axis 305. Similarly, the measured/calculated test fluid volume 352 is plotted using the test fluid volume axis 315 and the time axis 305. The test fluid flow rate 362 is depicted using the flow rate axis 320 versus the time axis 305. The time (time $t_0$ to time $t_{(n+1)}$) over which the leak detection value is calculated for test 332 as indicated by span 372.

Test 333 shows the measured/sensed pressure 343 using the pressure axis 310 and the time axis 305. The measured/calculated test fluid volume 353 is plotted using the test fluid volume axis 315 against the time axis 305. The test fluid flow rate 363 is plotted using the flow rate axis 320 and the time axis 305. Of course the time (time $t_0$ to time $t_{(n+1)}$) over which the leak detection value is calculated for test 333 is indicated by span 373.

Test 334 similarly includes the measured/sensed pressure 344 plotting the read against the pressure axis 310 against the time axis 305. The measured/calculated test fluid volume 354 is plotted using the volume axis 320 and the time axis 305. The test fluid flow rate 364 is shown plotted using the flow rate axis 320 and the time axis 305. The time (time $t_0$ to time $t_{(n+1)}$) over which the leak detection value is calculated for test 334 is indicated by span 374.

Test 335 includes the measured/sensed pressure 345 read using the pressure axis 310 and the time axis 30. The measured/calculated test fluid volume 355 is plotted using the test fluid volume axis 315 and the time axis 305. The test fluid flow rate 365 is plotted using the flow rate axis 320 and the time axis 305. Of course the time (time $t_0$ to time $t_{(n+1)}$) over which the leak detection value is calculated for test 335 is indicated by span 375.

It will be noted that the total test fluid volume pumped 351, 352, 353, 354, and 355 for each test is effectively the same. Thus, the data suggests that the tests 331, 332, 333, 334, and 335 are for mechanically similar components, such as for a series of annular and pipe rams in the BOP stack and as discussed previously.

Each of the measured pressure curves 341, 342, 343, 344, and 345 indicate a general exponential decay in the pressure as time passes, as discussed previously. The difficulty is to distinguish the normal and unharmful decrease in pressure from a loss or decrease in pressure that is reflective of a leak. Thus, the values of the pressure, as visually represented in curves 341, 342, 343, 344, and 345, are used as data or input values to calculate leak detection values as described above.

Figure 4:
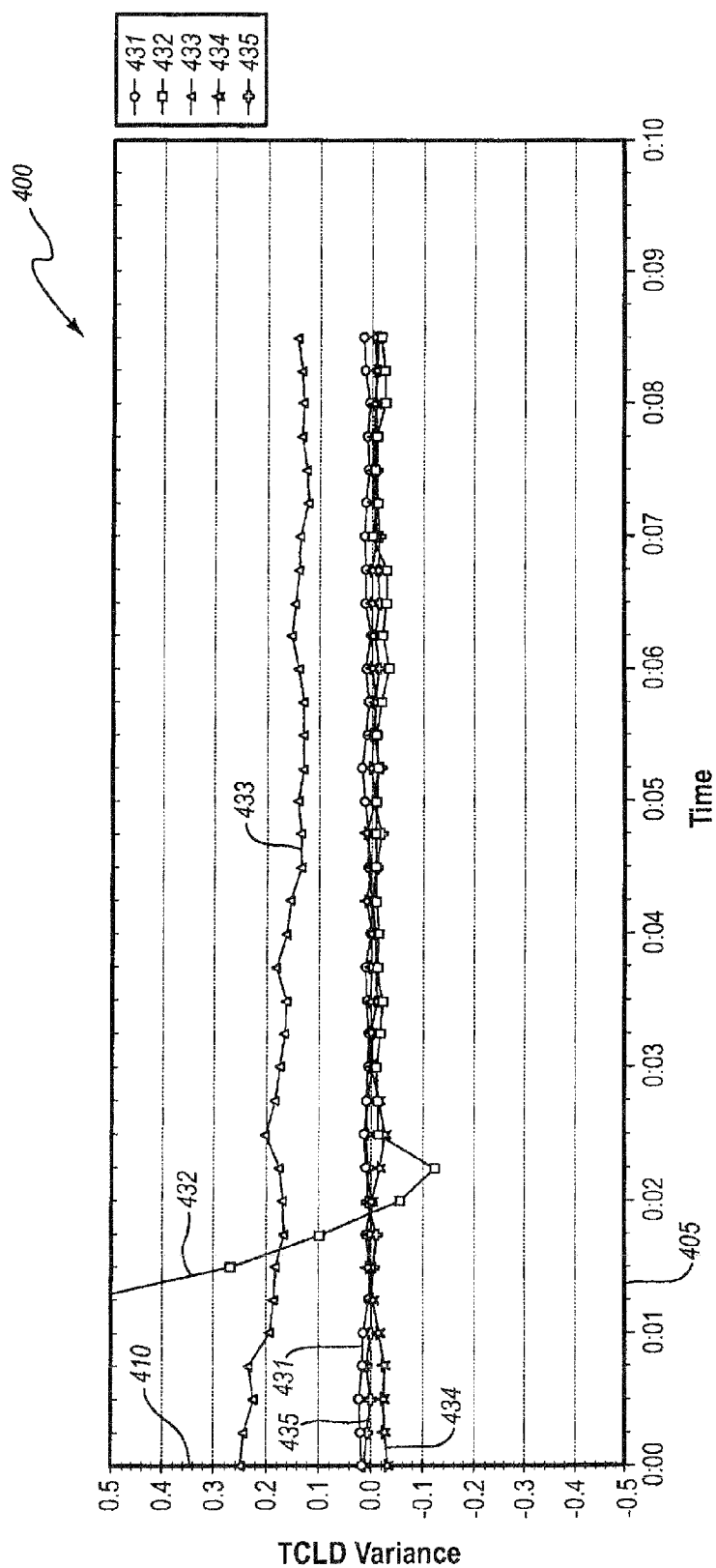
FIG. 4 is a plot of a series of leak detection values calculated from the test data provided in FIG. 3.

The graph or chart 400 of leak detection values 431, 432, 433, 434, and 435, that correspond with the leak detection tests 331, 332, 333, 334, and 335 over the time intervals 371, 372, 373, 374, and 375 are plotted in chart 400 in FIG. 4. The leak detection values are calculated in accordance with the method and the system as described above. The abscissa or horizontal time axis 405 has major gradations for every minute and minor gradations for every 15 seconds. The leak detection value axis 410 is the vertical or ordinate axis and, as previously, noted, is a unitless value with major gradations every 0.1 unit and minor gradations for every 0.02 units.

It is very apparent from chart 400 that leak detection values 431, 434, and 435 corresponding to tests 331, 334, and 335 in FIG. 3 are all around zero, indicating that the decrease in pressure is a result of the expecting thermal effect/decrease in temperature of the test fluid and the compressibility effect, rather than a leak.

On the other hand, leak detection values 432 and 433 have a significantly different character when plotted on chart 400 as compared to the leak detection values 431, 434, and 435. Thus, whether establishing a threshold leak detection value of 0.1 for example, or comparing the leak detection values 432 and 433 against the other leak detection values 431, 434, and 435, which are good and usable as a benchmark, the slopes or graphs associated with leak detection values 432 and 433 indicate clearly that the pressure system tested in 332 and 333 differs dramatically from the others 431, 434 and 435. This difference suggests there is failure of the system 15 and that it is leaking. As it turns out, the pressure system tested at 332 suffered a small, leaking valve early in the test, which was then closed, resulting in a leak detection value 432 that quickly returned to the pattern set by leak detection values 431, 434, and 435. The pressure system tested at 333 having a leak detection value curve of 433 suffered a slow leak in the system and, therefore, failed as a whole.

Referring back to FIG. 3, in another embodiment of the system and method for detecting leaks in a pressure system described herein, the rate-of-change of each of the measured pressure curves 341, 342, 343, 344, and 345 can be compared against previous rate-of-change measurements (not shown) taken during an initial baseline or benchmark test conducted on the same fluid control components, such as for the series of annular and pipe rams in the BOP stack described above. If, for example, the benchmark rate-of-change for pressure test 331 is 17 psi/min, and the predetermined limit or threshold for passing the test is ±3.0 psi/min, so long as the rate-of-change of pressure curve 341 is equal to or less than 20 psi/min and equal to or greater than 14 psi/min, and for a predetermined period of time (e.g. for about five minutes, for instance), pressure test 331 can be considered successful. If the rate-of-change of the pressure within the pressure system varied during the benchmark test (for example, 20 psi/min at time $t_0$ and 10 psi/min at time $t_{(n+1)}$), then care can be taken during pressure test 331 to record and calculate the rate-of-change of pressure curve 341 at equivalent moments of time $t_0$ and time $t_{(n+1)}$ so as to ensure an accurate comparison between the present rate-of-change value and the benchmark rate-of-change value.

With regards to the rate-of-change embodiment, if the current rate-of-change value is outside of the threshold band for a passing test when compared to the benchmark value, yet appears to be stabilizing in a manner which indicates that the pressure system can still hold pressure, pressure test 331 can optionally be extended for the complete duration of a standard or initial test to see if the pressure value reaches an approximately steady-state value. If this happens, then current pressure test 331 can be set as the new benchmark test for that particular pressure system or piping arrangement, so that any subsequent pressure tests which apply the rate-of-change method for comparing a current rate-of-change value against a benchmark rate-of-change value will then use pressure curve 341 as the baseline reference.

It should be noted that the conclusions reached about integrity of the system (i.e., leak or no leak) can be made quickly based on the leak detection values 431, 432, 433, 434, and 435. In the examples, the determination can be made in a period of time under 10 minutes. It is believed that reliable data and a relatable determination can be made in as little as 3 minutes; and in some systems, the determination can be made even in a period of less than 1 minute. As can be seen from the pressure data plotted in curves 341, 342, 343, 344, and 345 in FIG. 3, if each test would have been continued for approximately another 5 to 8 minutes until the pressure and test fluid were bled off would be unnecessary. In other words, over a period of five longer tests an additional 25 to 40 minutes of time would be spent testing the pressure systems; and that time would have been unnecessary if the present leak detection systems and methods were used.

Thus, example 1 illustrates that the system and method of leak detection as herein disclosed is fast and reliably indicative of defects.

Example 2

Figure 5:
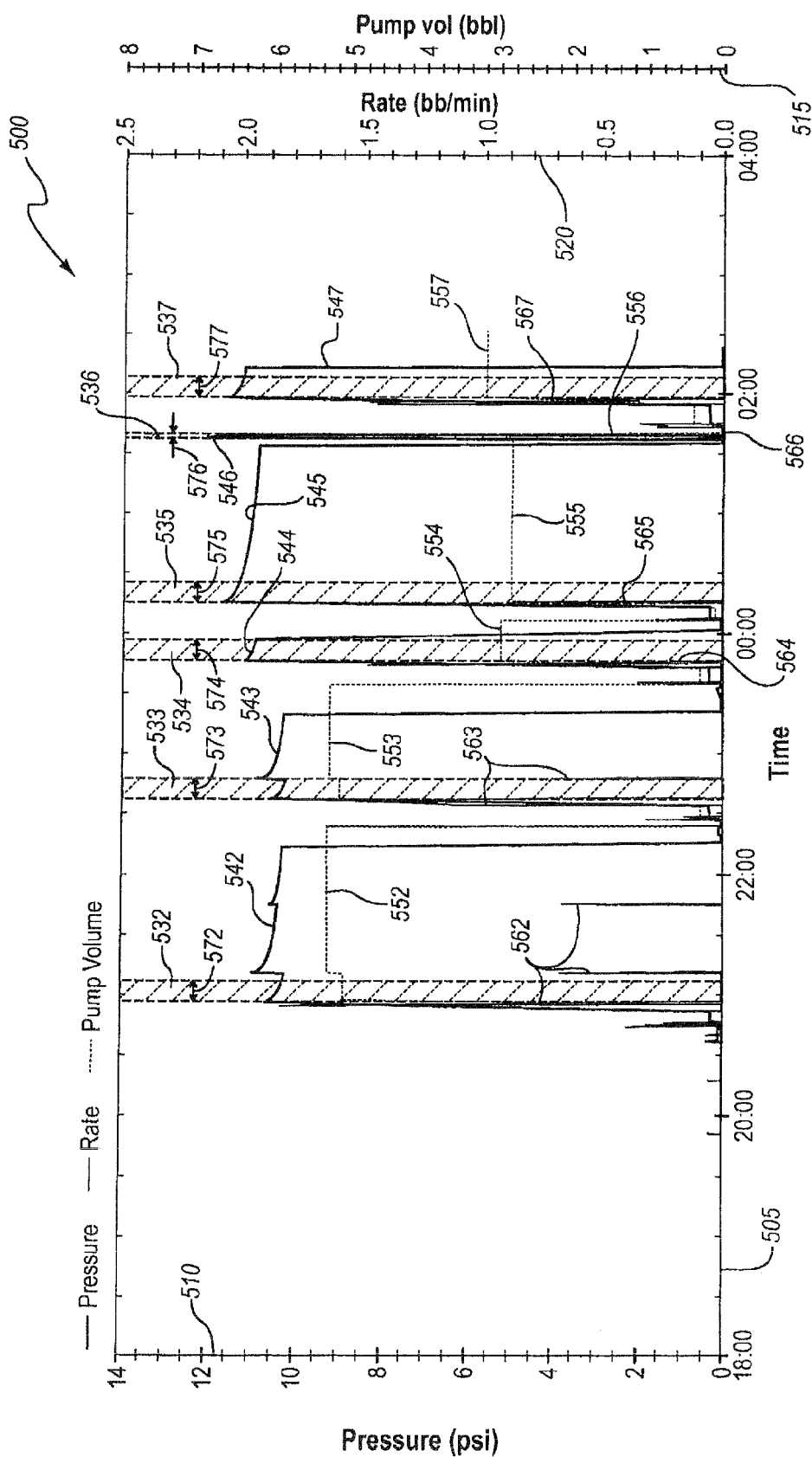
FIG. 5 is another plot of test data captured by the leak detection system, in accordance with another representative embodiment.
Figure 6:
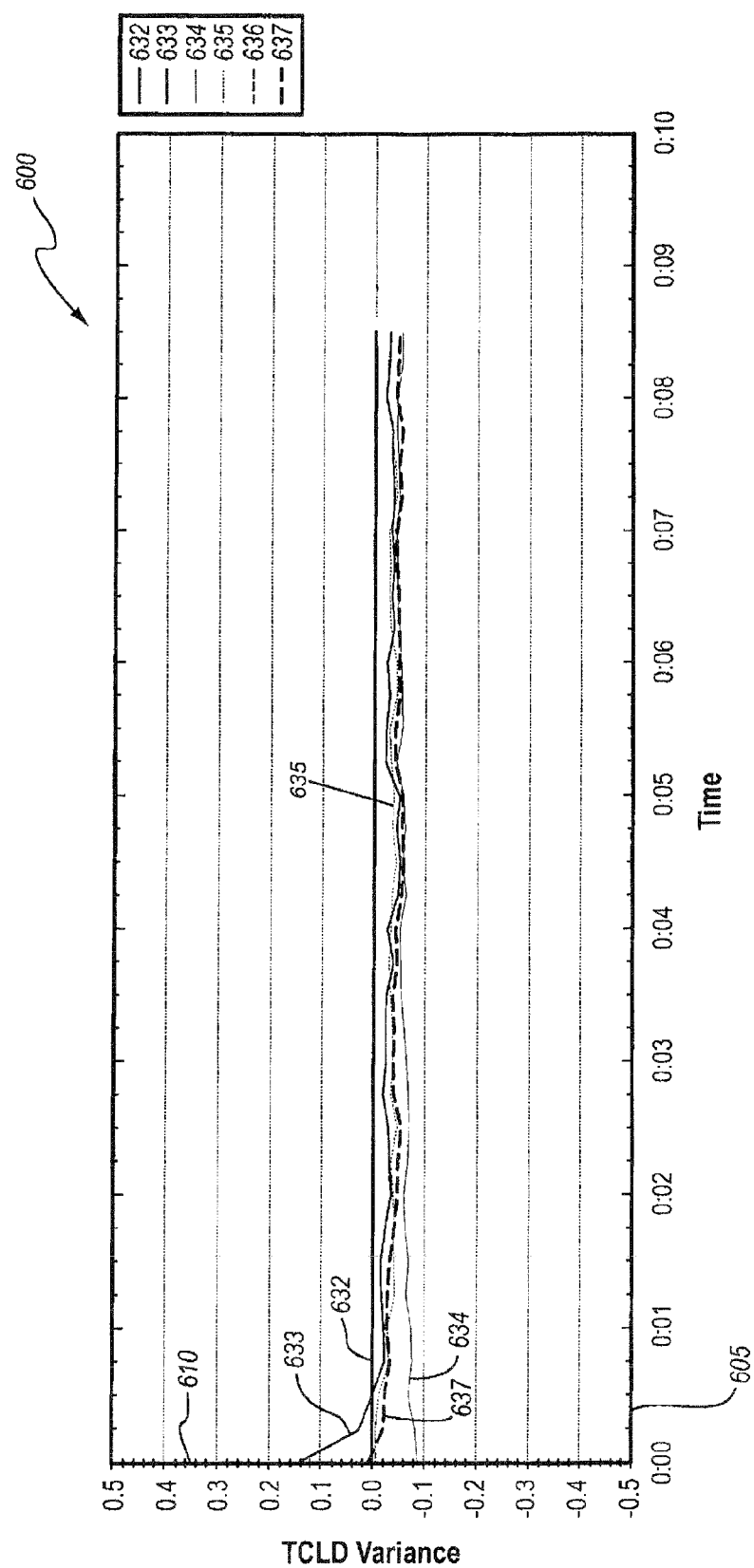
FIG. 6 is another plot of a series of leak detection values calculated from the test data provided in FIG. 5.

Example 2, as illustrated in the charts 500 and 600 provided in FIGS. 5 and 6, respectively, uses data from tests of several different fluid control components of the BOP stack that is significantly more noisy than that used in Example 1.

In FIG. 5, abscissa or horizontal axis is also called the time axis 505 which shows time with major gradations or intervals every two hours and minor intervals or gradations in 30 minute increments. The ordinate or left vertical axis can be called the pressure axis 510 which reflects the pressure of the pressure system 15 (FIG. 1) as measured by the pressure sensor 20. The pressure axis 510 has major gradations or intervals for every 2,000 pounds per square inch (psi) with minor gradations or intervals marking 500 psi increments. The ordinate or vertical flow rate axis 520 shows the rate at which the test fluid is pumped by the fluid pumping unit 12 as measured by the flow sensor 30 and/or as calculated by the software application as noted above. The flow rate axis 520 has major gradations or intervals for every 0.5 barrels per minute (bbl/min), or 21 gallons per minute, with minor gradations between the major gradations showing 0.1 bbl/min. The vertical test fluid volume axis 515 indicates the total test fluid volume pumped by the fluid pumping unit 12 as measured by the flow sensor 30 and/or as calculated by the software application as noted above and has major gradations or intervals for every barrel and minor gradations or intervals for every intervening 0.2 barrels of the total volume of test fluid pumped.

Six separate leak detection tests, 532, 533, 534, 535, 536, and 537 are plotted on the chart 500. Test 532 includes the measured/sensed pressure 542 on the pressure axis 510 read against the time axis 505. The measured/calculated test fluid volume 552 is plotted from axis 515 against the time axis 505. The test fluid flow rate 562 from axis 520 is plotted against the time axis 505. The time (time $t_0$ to time $t_{(n+1)}$) over which the leak detection value is calculated for test 532 as indicated by time span 572.

Test 533 includes the measured/sensed pressure 543 on the pressure axis 510 read against the time axis 505. The measured/calculated test fluid volume 553 is plotted from axis 515 against time axis 505. The test fluid flow rate 563 from axis 520 is plotted against the time axis 505. The time (time $t_0$ to time $t_{(n+1)}$) over which the leak detection value is calculated for test 533 is indicated by span 573.

Test 534 includes the measured/sensed pressure 544 on the pressure axis 510 read against the time axis 505. The measured/calculated test fluid volume 554 is plotted from axis 515 against time axis 505. The test fluid flow rate 564 from axis 520 is plotted against the time axis 505. The time (time $t_0$ to time $t_{(n+1)}$) over which the leak detection value is calculated for test 534 is indicated by span 574.

Test 535 includes the measured/sensed pressure 545 on the pressure axis 510 read against the time axis 505. The measured/calculated test fluid volume 555 is plotted from axis 515 against the time 505. The test fluid flow rate 565 from axis 520 is plotted against the time axis 505. The time (time $t_0$ to time $t_{(n+1)}$) over which the leak detection value is calculated for test 535 is indicated by span 575.

Test 536 includes the measured/sensed pressure 546 on the pressure axis 510 read against the time axis 505. The measured/calculated test fluid volume 556 is plotted from axis 515 against time axis 505. The test fluid flow rate 566 from axis 520 is plotted against the time axis 505. The time (time $t_0$ to time $t_{(n+1)}$) over which the leak detection value is calculated for test 536 as indicated by span 576. It should be noted that the data from test 536 appears to be indicate that the test was aborted.

Test 537 includes the measured/sensed pressure 547 on the pressure axis 510 read against the time axis 505. The measured/calculated test fluid volume 557 is plotted from axis 515 against the time axis 505. The test fluid flow rate 567 from axis 520 is plotted against the time axis 505. The time (time $t_0$ to time $t_{(n+1)}$) over which the leak detection value is calculated for test 537 is indicated by span 577.

It will be noted that the total test fluid volume pumped 552 and 553 in tests 532 and 533 are nearly the same. Thus, the data suggest that the tests 532 and 533 are for mechanically similar components, such as for a series of annular rams in the BOP stack as discussed previously. Similarly, the total test fluid volume pumped 554, 555, 556, and 557 are nearly the same. Thus, the data suggest that the tests 534, 535, 536, and 537 are also for mechanically similar components, such as, for example, a series of pipe rams in the BOP stack as discussed previously. Of course, and as previously discussed, the data for these components tested are merely exemplary; and the systems and methods disclosed herein are capable of testing other fluid control components of the BOP stack, as well as different pressure systems as set forth in the hereinbefore.

Each of the measured pressure curves 542, 543, 544, 545, 546, and 547 show a general exponential decay in the pressure as time passes. This reflects, in part, a change in temperature as discussed previously. As stated, it is important to differentiate between the normal decrease in pressure from a decrease in pressure relating to a problem such as a potentially harmful leak. Thus, the values of the pressure, as visually represented in curves 542, 543, 544, 545, 546, and 547 are used as data input values to calculate leak detection values as described above. Further, it should be noted that in tests 532 and 533, it is believed that additional test fluid was added to the pressure system 15, raising the pressure as the pressure curves 532 and 533 indicate. The flow rate curves 562 and 563 and volume curves 552 and 553 also indicate this. Regardless of the reason for adding the additional fluid, chart 600 of the calculated leak detection values will illustrate that the presently disclosed method and systems quickly and more easily allow the user of the present system to identify good tests (not leaking) from leaking pressure systems.

The chart 600 of the leak detection values 632, 633, 634, 635, 636, and 637 that correspond with the leak detection tests 532, 533, 534, 535, 536, and 537 over the time intervals 572, 573, 574, 575, 576, and 577 are plotted in chart 600 in FIG. 6. The leak detection values are calculated in accordance with the method and using the system as described above. The abscissa or horizontal time axis 605 has major gradations for every minute and minor gradations for every 15 seconds in between the minutes. The leak detection value axis 610 is the ordinate or vertical axis and, as previously noted, is valueless with major gradations every 0.1 units and minor gradations indicating 0.02 units.

By inspecting the chart 600 it can be seen that notwithstanding the different volumes used in the tests leading to curves 552, 553, 554, 555, 556, and 557 and pressures 542, 543, 544, 545, 546, and 547 for the respective tests, each of the leak detection values 632, 633, 634, 635, 636, and 637 all fall within the range 0.0 to negative 0.08 (−0.08) within the first 30 seconds of the test and hold relatively constant over the next 8.5 minutes. Thus, it can be seen that none of the tests indicate the existence of a leak when compared to the character of the leak detection values 532 and 533 of FIG. 5 that reflect a defect such as a leak. It can also be seen that embodiments of the presently disclosed method and system work accurately despite sometimes poor and/or inconsistent data, such as that created by spurious signals and/or improper procedures and/or with inexperienced fluid pumping unit operators.

It should also be noted that for purposes of the validation, test 532 and leak detection value or curve 632 was selected as a benchmark as typically would be the case when conducting the test in real-time at a well site. The remaining tests show good correlation of the leak detection values.

It should also be noted that the leak detection values 634, 635, and 637 (as previously noted, test 536 appears to have been aborted quickly) of the different fluid control components of the BOP stack show good correlation with the leak detection values 632 and 633 of the components leak tested in 532 and 533. Thus, it can be observed that the leak detection values provide consistent response despite the different subcomponent systems being tested.

Further, it is observed that the leak detection values 431, 432, 433, 434, and 435 fell in a range of approximately ±0.02 after 30 seconds for tests 331, 332, 333, 334, and 335 that occurred at pressures 341, 342, 343, 344, and 345 of between approximately 5,000 psi to 5,400 psi.

In comparison, it is observed that the leak detection values 632, 633, 634, 635, and 637 fell in a range of approximately 0 to about 0.08 after 30 seconds for tests 532, 533, 534, 535, and 537 that occurred at pressures 541, 542, 543, 544, 545, 547 of between approximately 10,300 psi to 11,500 psi. Thus, despite the significant difference in testing pressure, the leak detection values each fall within the range of ±0.1, which can be selected as an optional, general threshold value for the leak detection.

Turning back to FIGS. 5 and 6, it should be noted that the system and method operates so that the determination of whether there is a malfunction such as a leak can be made based on the leak detection values 632, 633, 634, 635, and 637 in under 10 minutes and, in many instances, less than that. However, normal pressure testing shows pressure data plotted in curves 542, 543, 544, 545, and 547 in FIG. 5 for tests that continued from a minimum of about 15 minutes to approximately 1.5 hours. To test the whole system, the operator would consume following the procedures of the prior art, at least 4.25 hours. In other words, the present leak detection systems and methods disclosed herein yield significant savings in time with a corresponding reduction in costs.

Example 3

The use of the embodiments of the methods and systems disclosed herein are not limited to pressure systems that operate at pressures of several thousand pounds per square inch. Indeed, the methods and systems disclosed can be used, as noted, for pressure systems that operate at pressures that are orders of magnitude lower than the previous examples, including, but not limited to, low-pressure tests for the systems disclosed above, such as low pressure fluid lines, laboratory equipment, and the like.

A further advantage of embodiments of the methods and systems disclosed is that they have the capability of measuring and validating pressure tests and detecting leaks on pressure systems that undergo a first pressure test at a first pressure and subsequently undergo a second pressure test at a second pressure. The second pressure can be significantly different than the first pressure and, optionally, the second pressure can be orders of magnitude higher or lower than the first pressure. A disadvantage of the prior art is that resolution of the data and methods of presenting the data makes the validation of widely divergent test data quite difficult and, in some instances, impossible. For example, an analog circular chart recorder used in prior art methods typically have a scale from 0 to 15,000 psi, with major gradations of 1,000 psi and minor gradations of 250 psi. Such a scale may be appropriate for high pressure tests of several thousand psi, but the resolution is unacceptable with low pressure tests of a few hundred psi.

Figure 9:
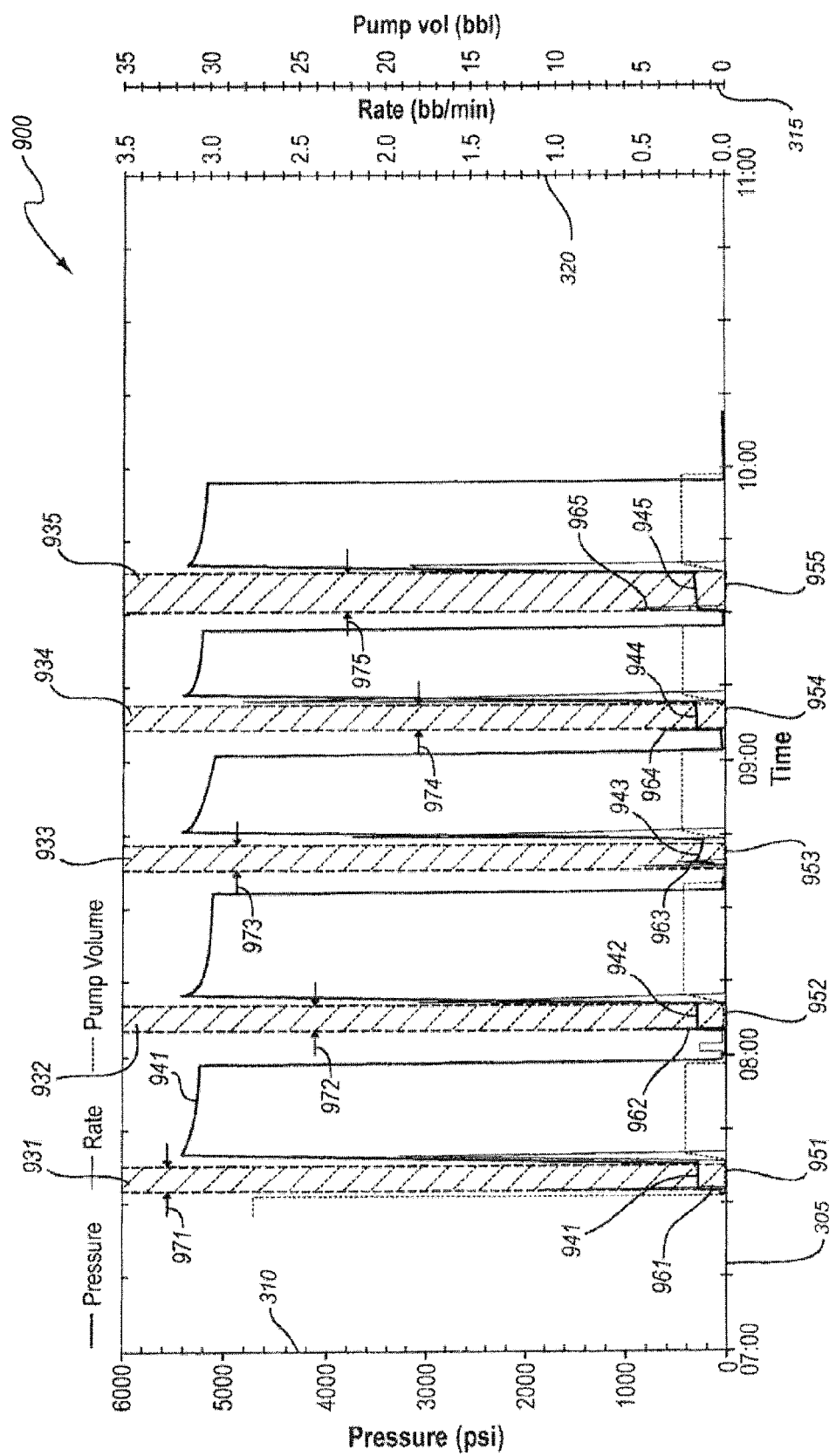
FIG. 9 is another plot of test data captured by the leak detection system, with different and additional aspects noted as relating to another representative embodiment.

Turning to Example 3, chart 900 of FIG. 9 plots the same test data presented in chart 300 of FIG. 3, which test data was captured during the pressure tests performed on the several different fluid control components of a BOP stack. That is, FIGS. 3 and 9 are the same chart with the same data, but FIG. 3 provides component numbers and a discussion of a high pressure test of the components, whereas FIG. 9 provides component numbers and a discussion of a series of low pressure tests that preceded each of the high pressure tests.

For clarity and to avoid clutter, FIGS. 3 and 9 repeat only a few common components rather than all of the components common to each chart. More specifically, the abscissa or horizontal axis is the time axis 305. The time axis has larger units of time on an hourly basis, with the minor gradations for 15 minute increments. The ordinate or left vertical axis is the pressure axis 310 which shows the pressure of the pressure system 15 (FIG. 1) as measured by the pressure sensor 20. The left vertical axis show major gradations for every 1,000 pounds per square inch (psi) with minor gradations between the major gradations marking 200 psi increments. The flow rate axis 320 reflects the rate at which the test fluid is pumped by the fluid pumping unit 12 as measured by the flow sensor 30 and/or as calculated by the software application as noted above. The flow rate axis 320 has major gradations for every 0.5 barrels per minute (bbl/min), or 21 gallons per minute, with minor gradations in between marking every 0.1 bbl/min. The test fluid volume axis 315 indicates the total test fluid volume pumped by the fluid pumping unit 12 as measured by the flow sensor 30 and/or as calculated by the software application as noted above and has major gradations or units for every barrel and minor gradations or units for every 0.2 barrels of total volume of test fluid pumped.

FIG. 9 plots five separate low pressure leak detection tests, 931, 932, 933, 934, and 935 are plotted on the chart 300. Each of the low pressure tests 931, 932, 933, 934, and 935 precedes in time the high pressure tests 331, 332, 333, 334, and 335, respectively, that were discussed with respect to Example 1 and FIG. 3.

Returning to FIG. 9, low pressure test 931, 932, 933, 934 and 935 each show the measured/sensed pressure 941, 942, 943, 944 and 945 respectively read against the pressure 305. The measured/calculated test fluid volume 951 is plotted using the volume axis 315 against the time axis 305. The test fluid flow rate 961 is plotted using the axis 320 against or using the time 305. The time (time $t_0$ to time $t_{(n+1)}$) over which the leak detection value is calculated is indicated by spans 971, 972, 973, 974 and 975, respectively.

It will be noted that the total test fluid volume pumped 951, 952, 953, 954, and 955 for each low pressure test is effectively the same. That is, the data suggests that the low pressure tests 931, 932, 933, 934, and 935 are for mechanically similar components, as discussed above in Example 1.

As discussed in Example 1 above, each of the measured pressure curves 341, 342, 343, 344, and 345 in FIG. 3 indicate a general exponential decay in the pressure as time passes. Further, and as also noted, it can be difficult to distinguish the normal and unharmful decrease in pressure caused by a decrease in fluid temperature from a decrease in fluid pressure which is the result of a potentially harmful leak.

In the instance of the low pressure tests, it should be noted that the resolution, particularly of the pressure 941, 942, 943, 94, and 945 against the pressure axis 310 in FIG. 9 is relatively poor compared to the resolution of the pressure curves 341, 342, 343, 344, and 345 in FIG. 3 when viewed on the common scale of pressure axis 310. That is, the resolution of the pressure 941, for example, appears relatively constant at about 250 psi, which is in sharp contrast to the resolution for high pressure curve 341 in FIG. 3 which reflects a change in pressure of nearly 250 psi. The presently disclosed methods and systems can optionally display a pressure axis 310 (as well as other axis date) with a user-selected, a pre-selected, or an automatically-selected range of data and, therefore, provide better resolution for a specific range of data for a given test. Nonetheless, one scale may be adequate for a given data set, but rarely will that same scale provide sufficient resolution for another data set, particularly with analog prior art methods that have fixed data ranges for which the data are plotted.

The same method and systems discussed above in Example 1 and elsewhere can be applied to the low pressure tests. That is, a leak detection value is calculated for each low pressure test just as it is for the high pressure test and, optionally, graphically displayed just as the leak detection values 431, 432, 433, 434, and 435 were displayed in FIG. 4.

A further application and benefit of the disclosed methods and systems accrue in the particular scenario in which a low pressure test precedes a high pressure test. The ability to detect a leak during the low pressure test, something not possible given the resolution and capability of prior art methods, permits a user of the present invention to take remedial action to investigate and/or to stop a leak following a the low pressure test and before preceding to the high pressure test phase. Taking preventive or remedial action at the low pressure test phase reduces the risk to equipment that might fail catastrophically under high pressures; reduces the risk to personnel that might otherwise be in the area of the equipment or pressure systems during which the pressure systems fail while they undergo a high pressure test; reduces the risk to the environment should the pressure systems otherwise fail while they undergo a high pressure test; and reduces the time to detect the leak because a leak could potentially be discovered at the low pressure stage before undertaking the time and money to conduct a high pressure test.

ADDITIONAL EMBODIMENTS

In cases where the pressure system 15 of FIG. 1 comprises multiple fluid pathways and fluid control components, the system and method for detecting leaks described herein can be adapted to create a test plan for automatically testing the pressure integrity of each critical component in the pressure system, even if the components are located remotely from one another or on different fluid pathway. The test plan can include a planned sequence of test steps which test all the critical fluid control components in the pressure system. By using the computer system 22 and one or more software applications running on the computer system, the leak detection system can continuously monitor the parameters of the leak detection test, such as the fluid pressure from the pressure sensor 20 and the flow rate or the flow volume from the flow meter 30, etc., at designated time intervals throughout the planned sequence of test steps, to automatically confirm that each test step has been properly performed and to verify that each fluid control component tested during the procedure will hold against the designated pressure.

Figure 10:
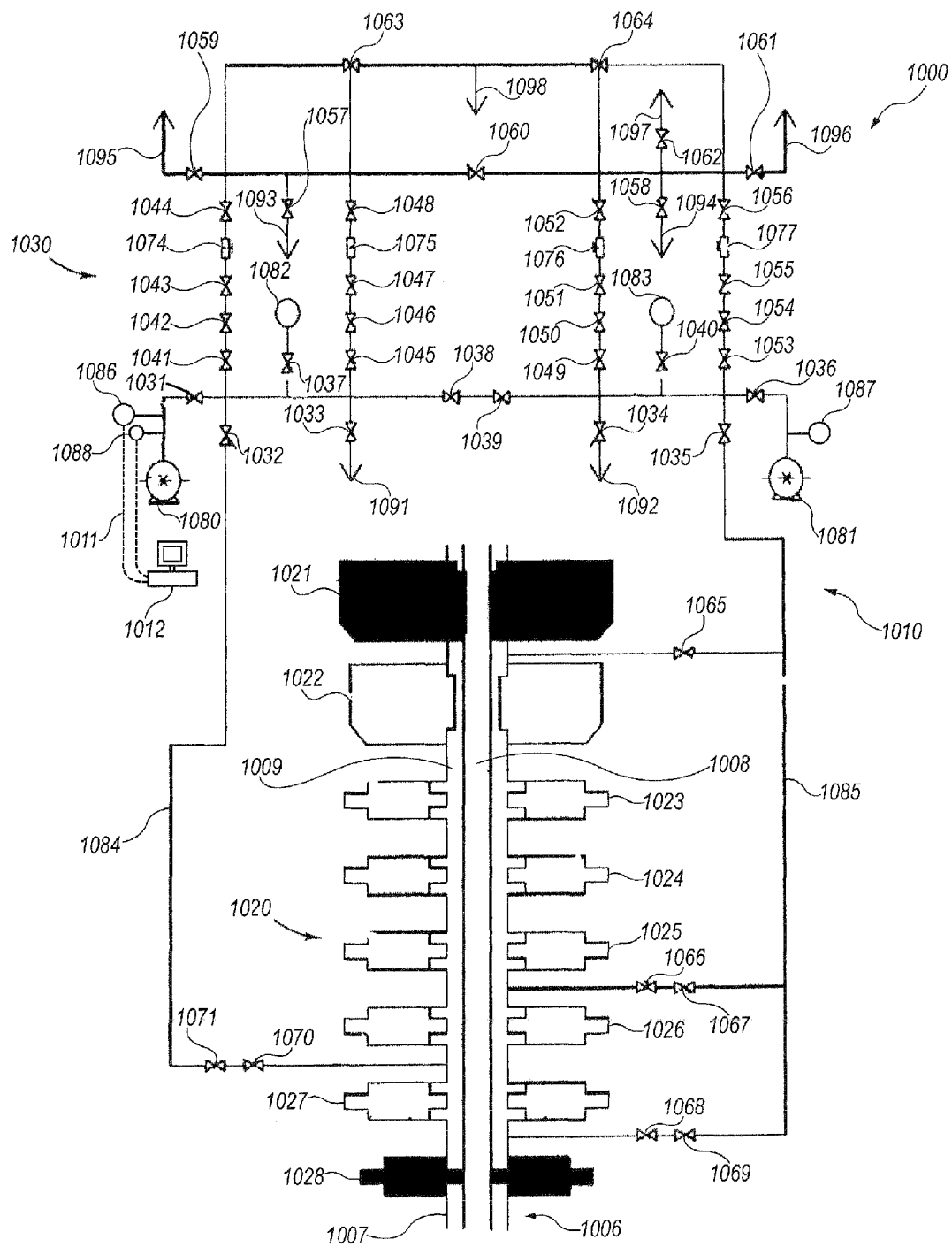
FIG. 10 is a schematic illustration of a pressure system for a subsea BOP stack of an oil rig, including a choke manifold assembly located on the oil rig, as may be tested with another representative embodiment.

This feature can be especially useful when applied to complex piping systems, such as the representative piping system 1010 for the subsea BOP stack 1020 of an oil rig shown in FIG. 10. For instance, the system and method for detecting leaks described hereinabove can be used to test the pressure integrity of the multiple fluid control components and fluid pathways included within the both choke manifold assembly 1030 located on the oil rig above the surface of the water, as well as the individual BOPs located in the subsea BOP stack 1020. Moreover, because fluid communication can be established between the choke manifold 1030 and the subsea BOP stack 1020 through the choke 1084 and kill 1085 lines, the system and method can also include the means for simultaneously testing portions of the BOP stack 1020 and portions of the manifold assembly 1030 during the same test step.

As shown in the schematic illustration 1000 or diagram of FIG. 10, the pressurizable piping system 1010 of the subsea BOP stack 1020 and choke manifold 1030 for an oil rig may include a plurality of pressure control components, including valves 1031-1071, pressure gauges 1082, 1083, bleed lines 1091-1098, choke valves 1074-1074, pressure sources 1080, 1081, choke and kill lines 1084, 1085, and blowout preventers (BOPS) 1021-1028. The plurality of pressure control components may also include any number of rigid tubing or piping conduits, flexible tubing or piping conduits, fittings, joints, seals or other structural element, etc., not specifically numbered herein but which may be combined with the above-identified fluid control components to form a plurality of fluid pathways.

The movable fluid control components of the piping system, such as the valves 1031-1071, choke valves 1074-1077 and BOPs 1021-1028 can be configured or aligned to form the plurality of fluid pathways, each of which can be separately and independently pressurizable. The various fluid pathways may also include additional movable or non-movable fluid control components to be tested, so that any one particular testable fluid control component may be included within two or more of the independently pressurizable fluid pathways. In this way the testable component may experience pressure testing multiple times.

Referring again to the schematic illustration of FIG. 10, the individual BOPs 1021-1028 can be mounted one above the other to form the BOP stack 1020. As known to one of skill in the art, the subsea BOP stack typically includes a variety of BOP types, such as annular BOPs 1021, 1022, variable pipe ram BOPs 1023, 1024, 1025, one or more shear ram BOPs 1026, one or more blind rams 1027, and often a test ram 1028. Additional BOP types not specifically described herein may also be incorporated into the BOP stack 1020.

Also shown in FIG. 10 are the wellbore 1006 below the BOP stack, the well casing 1007 to which the BOP stack is affixed, the drill string or drill tubing 1008 which can be inserted and withdrawn through center opening of the BOP stack 1030 and the well casing 1007, and the annular space 1009 between the well casing/BOP stack and the drill tubing 1008 which is typically filled with drilling fluids flowing back upwards through the wellbore 1006 from the formation being drilled below during normal drilling operations The test ram BOP 1028 located at the bottom of the BOP stack 1020 can be configured to seal the wellbore 1006 against any pressure applied to the upper face of the test ram 1028 during pressure testing of the BOP stack 1020 and choke manifold 1030. Each of the plurality of BOPs located above the test ram BOP, however, are configured to seal the wellbore 1006 against pressure applied to their lower faces, either from the pressure testing or from a 'kick' of fluid pressure traveling upwards from the formation being drilled. Thus, during BOP pressure testing the drill string or drill tubing 1008 is first raised to a level at least above the shear ram 1026, and then the test ram BOP 1028 is activated to seal the wellbore 1006 against the pressurized test fluid provided by fluid pumping units 1080, 1081. Closing the test ram 1028 also operates to define an enclosed volume within the BOP stack 1020 and choke manifold 1030 for containing the pressurized test fluid. If the BOP stack 1020 does not include a test ram BOP 1028, the drill string 1008 can be withdrawn and a removable pressure plug inserted into the opening of the casing 1006 below the lowest BOP in the BOP stack to temporally seal the wellbore 1005 during the BOP pressure tests.

Depending on which of the individual BOPs 1021-1027 is being tested during a particular test step, the pressurized test fluid is provided from the fluid pumping units or pressure sources 1080, 1081 on the drilling rig or vessel (not shown) to the enclosed volume within the BOP stack 1020 through either the choke line 1084 or through the kill line 1085, and as directed through the alignment of the various valves in the choke manifold 1030. In offshore drill applications, the choke line 1084 and kill line 1085 can be two separate flow lines attached to and running parallel with the marine riser which connects the subsea BOP stack 1020 with the drilling rig.

Although in normal well-control operations the pressurized fluid, such is drilling mud, is supplied to the BOP stack through the kill line 1085 and withdrawn from the BOP stack through the choke line 1084, during the pressure testing of the BOP components described herein the pressurized fluid can be supplied to the BOP stack through either (or both) of the choke line or the kill line.

In accordance with one embodiment, the schematic illustration 1000 of the piping system 1010 for the subsea BOP stack 1020 and choke manifold 1030 shown in FIG. 10 can be provided on the computer system 1012 associated with the leak detection system and method described herein. This schematic illustration 1000 can be used to specify the fluid control components that are present in a pressure system 1010 and how they are connected, thus allowing the user to visualize the fluid pathways associated with all of the fluid control components. Furthermore, the schematic illustration 1000 may be made available to the user on the screen of the computer system or the graphical output device, for use as a tool when creating the plan steps in a test plan that will provide coverage of every desirable combination of fluid control components. This may be accomplished by selecting specific fluid control components and specific aspects of those components depicted in the schematic illustration 1000 to organize each plan step in the test plan.

The schematic illustration 1000 of the piping system 1010 may also be used to define what constitutes a complete pressure test for a particular fluid control component. This definition can vary depending on the type of component under test and the specific aspects of the component to be tested. As used herein, an aspect is a particular portion or attribute of a fluid control component that is tested during a test step, such as a side of a valve, or a side of a ram plus the size of drill tubing present in that ram. Moreover, a single test step may only test one aspect of the component, and components having multiple aspects may require multiple test steps to test each of these aspects and achieve a complete pressure test. An aspect of a fluid control component may be tested if it is included in at least one test step during the pressure test. Moreover, one test step can test aspects from multiple components at once.

One example of an aspect of a fluid control component is the face or side of a valve. Valves can be tested from one of two sides, thus having two aspects that might need to be tested. One side, both sides, or no sides may be required for testing. If no sides are required to be tested, the valve would not need to show up in a test report but may still appear in the schematic illustration. In accordance with one embodiment, a particular valve aspect may be considered tested if that side is pressurized and the other side leads to a bleed path. Moreover, the bleed path may be vented to atmosphere through a bleed port on the choke manifold so as to create the maximum pressure differential across the valve. As test pressures can be quite high, in the order of 5,000 psi to 15,000 psi, a bleed line open to atmosphere may provide an added benefit in that any leakage past a tested component will likely result in visible confirmation of that leakage as the high pressure fluid exits the opening.

A valve is considered fully tested if all required aspects have passed testing. If a valve requires both aspects to be tested, then it is considered fully tested only if both sides see pressure (and optionally, the other side sees bleed), as would occur in two different test steps. If only one side is required to be tested, the valve may be considered fully tested if that side sees pressure and optionally, the opposite side leads to the bleed path. Thus, the following test steps may be used to test an exemplary set of fluid control valves and their aspects:

Test Step 1: Valve A, Bottom Side+Valve B, Top Side
Test Step 2: Valve A, Top Side+Valve C, Left Side Rams and annulars in the BOP stack 1020 can be tested similarly to valves in that they must be closed, pressurized from a certain side, and must hold pressure. Annulars and some types of rams (e.g. variable-bore pipe rams, or "VBRs") are required to form a seal on different sizes of drill tubing, and must be tested on all these different size aspects in order to be considered fully tested. Therefore each ram or annular may have several aspect combinations that need testing. By way of example, assume a VBR ram is required to close and seal around drill pipe sized at 4½", 5¾", and 6⅞", and must be tested from the bottom. Thus, the following combinations of pipe size and pressurized side must be tested, with each combinations being considered a distinct aspect of the VBR.

Test Step 1: VBR 1 with 4½" Tubing
Test Step 2: VBR 1 with 5¾" Tubing
Test Step 3: VBR 1 with 6⅞" Tubing For some fluid control components there is only the requirement that the component be tested. For example, a Kelly hose is flexible conduit that is pressurized from the inside as fluid is pumped through it, with the exterior of the hose serving as the bleed path. Consequently, a Kelly hose has no true notion of different aspects, only that it requires testing.

Also shown in FIG. 10 are the pressure sensors 1086, 1087 optionally located proximate the fluid pumping units 1080, 1081, respectively, as well as an optional flow sensor 1088 also located proximate fluid pumping unit 1080. These sensors can be placed in electrical communication with the system computer 1012 through hardwired signal lines 1011 or through some wireless communication system, as described above. During testing the pressure sensors 1086, 1087 and flow sensor 1088 can be located anywhere on the pressure system that is in fluid communication with the fluid pathway being pressurized. As apparent to one of skill in the art, a convenient location for the sensors would be proximate the fluid pumping units 1080, 1081 so as to reduce the possibility of the sensor(s) being isolated from the fluid pathway being tested by a closed valve or similar fluid control component.

Moreover, the pressure gauges 1082, 1083 installed within the choke manifold 1030 may or may not be utilized as the pressure sensors 1086, 1087 in the system and method describe herein. This is because the pressure gauges 1082, 1083 can often be standard analog devices with a visibly-observable dial indicators, while the pressure sensor(s) included with the test procedure described herein require at least a digital output to the computer system, either at the sensor itself or through an A/D converter installed between the sensor and the computer system.

The pressure sensors 1086, 1087, flow sensor 1088, signal lines 1011 and system computer 1012 illustrated in FIG. 10 are shown for the purposes of the present disclosure, and may or may not be included in the typical schematic illustration provided to the user by the computer system to be used in leak test planning and execution.

Figure 10A:
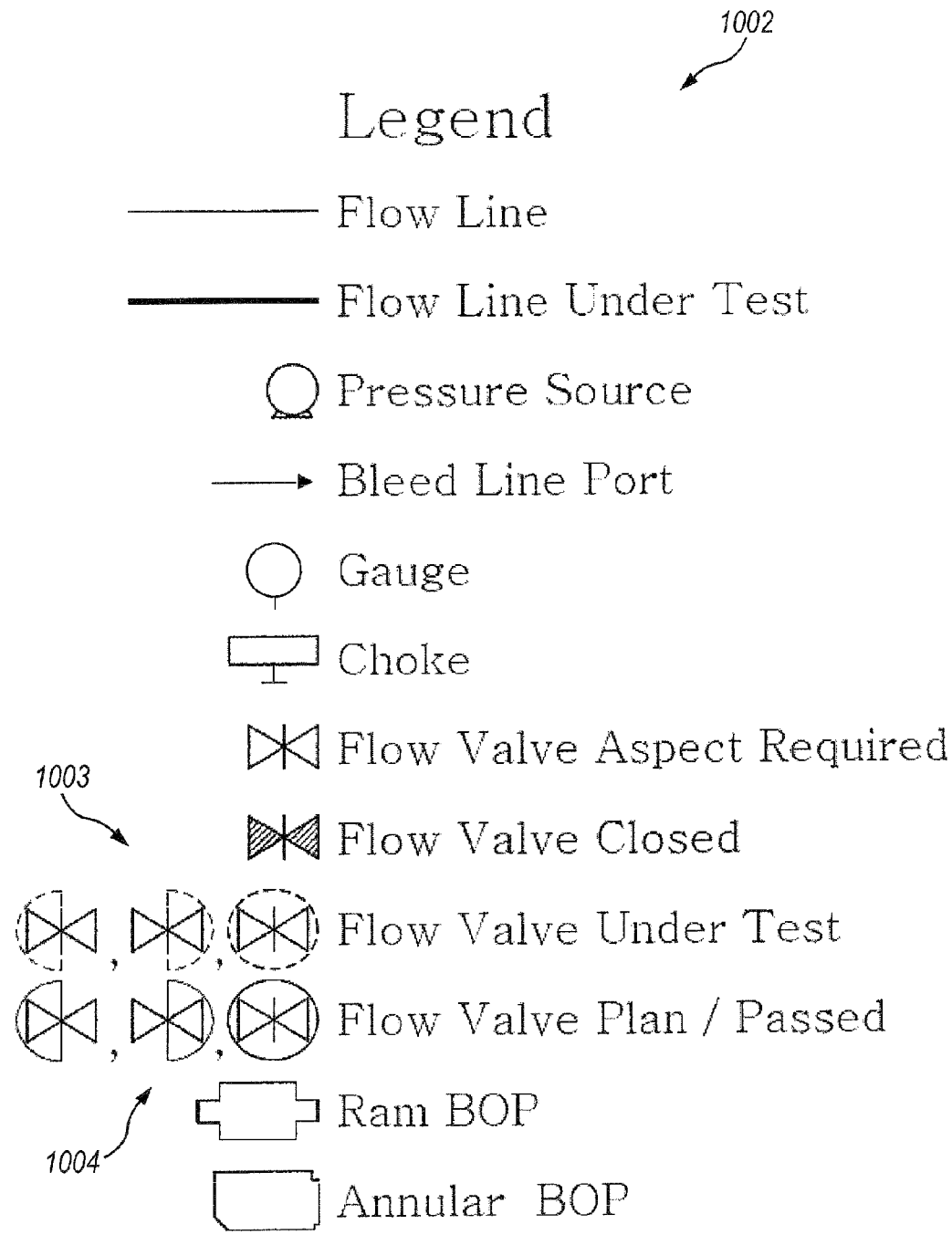
FIG. 10A is a legend of symbols and designations for marking various aspects of the fluid control components in a schematic illustration, such as may be used when defining a pressure integrity test plan with the schematic illustration shown in FIG. 10, in accordance with another representative embodiment.

A legend 1002 is provided in FIG. 10A to define the various exemplary symbols and designations used in the schematic illustration 1000 of FIG. 10. Other symbols and designations may be used, along with color coding to better illustrate the various test steps and functions in the test plan. The symbols can also be used to define the testable aspects of the individual flow control components, such the dashed semi-circles 1003 used to show which side or aspect of a particular flow valve is under test and the solid semi-circles 1004 used to show which side or aspect of a particular flow valve has passed pressure testing.

FIGS. 11-14 are schematic illustrations 1100-1103 of various test steps in a test plan for pressure testing a representative piping system 1110 that may be similar to a portion of the choke manifold shown above. The piping system 1110 includes pressure sources 1180 and 1181, pressure gauges or sensors 1186, 1187, fluid control valves 1131-1136, and bleed lines 1191 and 1192. Various closed fluid pathways for holding the pressurized test fluid are incorporated into the test plan and may be shown as heavy black lines. Open fluid pathways for venting any pressurized test fluid which leaks past the tested fluid control components may also be incorporated into the test plan, and may be shown as light black lines. In addition, the symbols and designations used in preparing and tracking the test steps illustrated in FIGS. 11-14 can be consistent with the legend of FIG. 10A.

Figure 11:
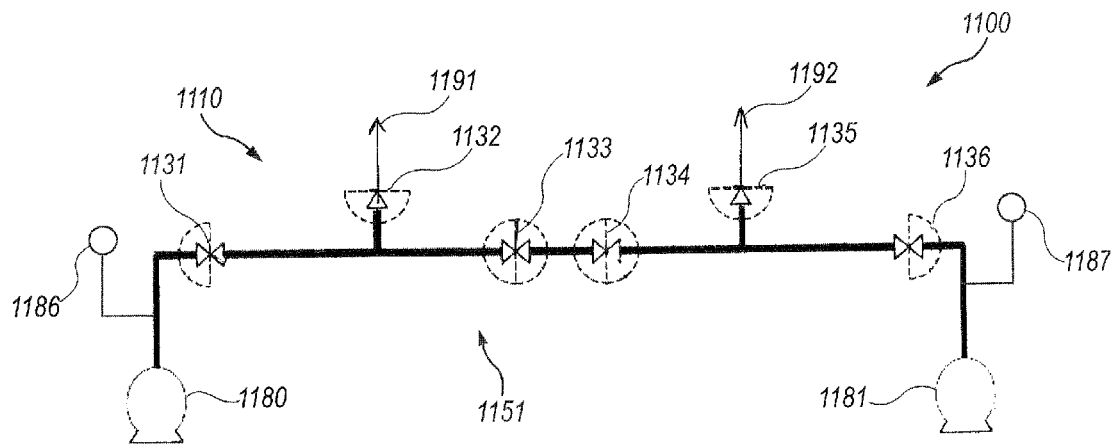
FIG. 11 is a schematic illustration of another exemplary pressure system defining a test plan for specific fluid control components included within the pressure system, in accordance with another representative embodiment.

A schematic illustration 1100 for a test plan for testing the fluid control components associated with fluid pathway 1151 is shown in FIG. 11. The specific aspects of fluid control valves 1131-1136 selected for testing are shown with dashed semi-circle symbol positioned on the schematic illustration to indicate which face or side of the valve is to be tested. Thus, in accordance with schematic illustration 1100, the following valve aspects have been selected for testing during the one or more test steps in the test plan:

Valve 1132—Bottom Aspect
Valve 1135—Bottom Aspect
Valve 1133—Left Aspect and Right Aspect
Valve 1134—Left Aspect and Right Aspect
Valve 1131—Left Aspect
Valve 1136—Right Aspect With two fluid pumping units 1180, 1181, the left aspects of valves 1133 and 1134 can be tested with test fluid supplied from pumping unit 1180, while the right aspects of valves 1133 and 1134 can be test with test fluid supplied from pumping unit 1181.

Figure 12:
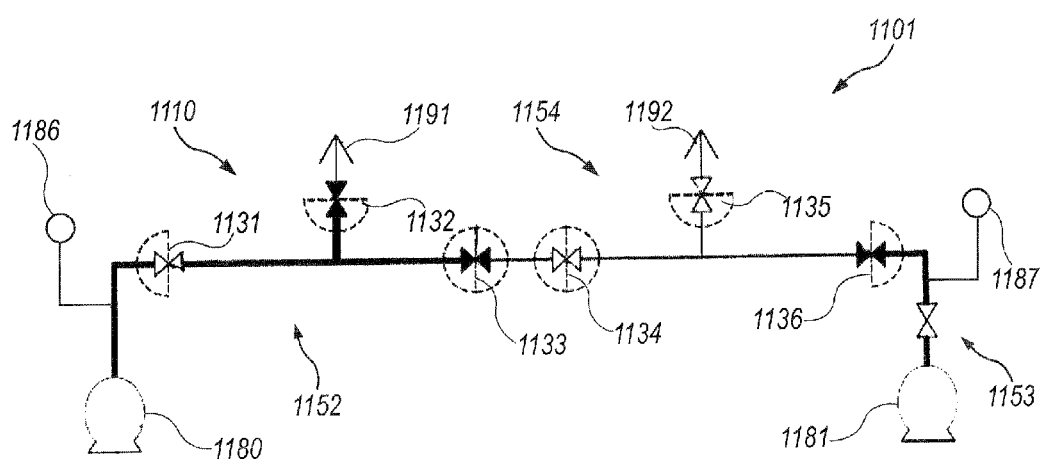
FIG. 12 is another schematic illustration of the exemplary pressure system of FIG. 11 being configured into two fluid pathways during a first step in the test plan, in accordance with another representative embodiment.

FIG. 12 is schematic illustration 1101 of the piping system 1110 showing a first test step for setting the valves selected in the test plan of FIG. 11. In this step, valves 1131, 1134 and 1135 are open while valves 1132, 1133 and 1136 are closed. With pressurized fluid being supplied both by pressure source 1180 and by pressure source 1181, this first step will therefore test the bottom aspect of valve 1132, the left aspect of valve 1133 and the right aspect of valve 1136. Pressurized fluid supplied by pressure source 1180 will pass through valve 1131 but will be closed off at valve V11 and V20 to form closed fluid pathway 1152. The pressure within fluid pathway 1152 will be monitored by pressure sensor 1186. In a similar fashion, pressurized fluid from pressure source 1181 will be closed at valve 1136 to form closed fluid pathway 1153. The pressure within fluid pathway 1153 will be monitored by pressure sensor 1187.

Furthermore, valve 1134 and valve 1134 are both open, which forms another fluid pathway 1154 between valve 1133 and valve 1136, and which fluid pathway 1154 may be vented to atmosphere through bleed line 1192. Thus, any pressurized test fluid which leaks passed fluid control valve 1133 from fluid pathway 1152, or any pressurized test fluid which leaks passed fluid control valve 1136 from fluid pathway 1153, may be visible to the user as it exits from bleed line 1192, thereby providing further indication that either valve 1133 or valve 1136 has failed to maintain their respective pressures. As valve 1132 leads directly to bleed line 1191, moreover, any pressurized test fluid which leaks passed fluid control valve 1132 from fluid pathway 1153 may also be visible to the user as it exits from bleed line 1141.

If the pressure measurements taken at pressure sensor 1186 and at pressure sensor 1187 remain substantially constant or within the limits of the thermal compensation algorithm described hereinabove with respect to FIGS. 1-9, and if no leakage of pressurized fluid is observed exiting piping subsystem 1110 through bleed lines 1191 or 1192, then it will be confirmed that the bottom aspect of valve 1132, the left aspect of valve 1133 and the right aspect of valve 1136 have passed. However, if there is an unacceptable pressure reading at pressure sensor 1186, even without a corresponding release in test fluid from bleed lines 1191 or 1192, this will indicate that either valve 1132 or valve 1133 has failed. It is notable that the first test step shown by schematic illustration 1101 in FIG. 12 may not provide conclusive evidence of which valve failed.

Figure 13:
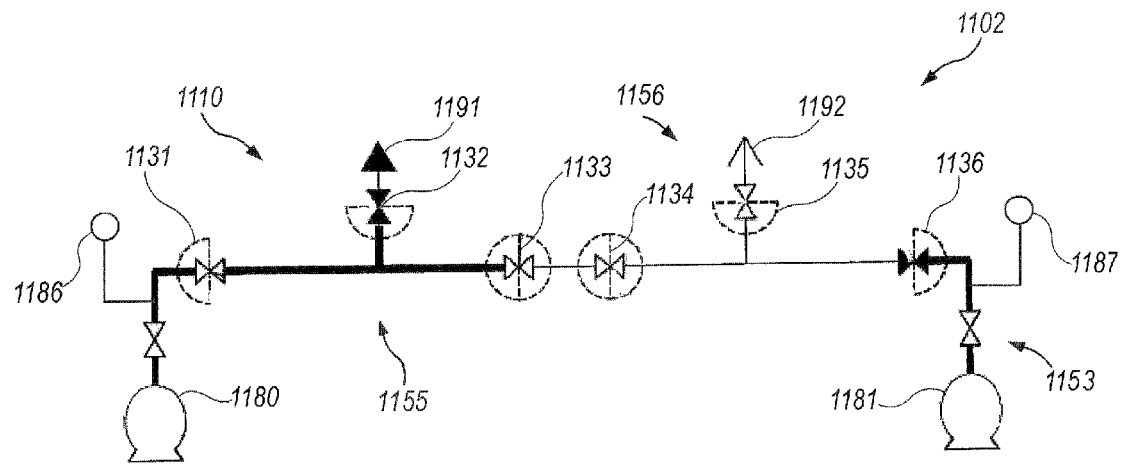
FIG. 13 is another schematic illustration of the exemplary pressure system of FIG. 11 being configured into a different fluid pathway during a second step in the test plan, in accordance with another representative embodiment.

In this situation, a second test step may be set up as shown with the schematic illustration 1102 in FIG. 13, with valve 1133 moved to an open position and valve 1134 moved to a closed position, and with the remaining components remaining in the same configuration as the first test step of FIG. 12. Note that with valves 1131 and 1132 remaining the same condition as in the first test step and with valve 1133 now being open, a new fluid pathway 1155 has been formed. Accordingly, this second step will test the left aspect of valve 1134 and re-test the bottom aspect of valve 1132 located on fluid pathway 1155, and re-test the right aspect of valve 1136 located on fluid pathway 1153. Accordingly, if an acceptable pressure reading is now present at pressure sensor 1186 monitoring the pressure in fluid pathway 1055, this will indicate that valve 1132 has passed and that the likely faulty fluid control component is valve 1133.

The second test step shown by the schematic illustration 1102 in FIG. 13 may also be set up and run as fluid pathway 1155 even if the first test step as fluid pathway 1152 shown in FIG. 12 was successful, in order to test the left side aspect of valve 1134. It can be seen, therefore, that the same iterative test procedures can applied to the pressure system 1110 to confirm passed aspects of previously-tested fluid control components, test aspects of additional fluid control components, and to further isolate failures down to one or more particular leaking fluid control components.

Figure 14:
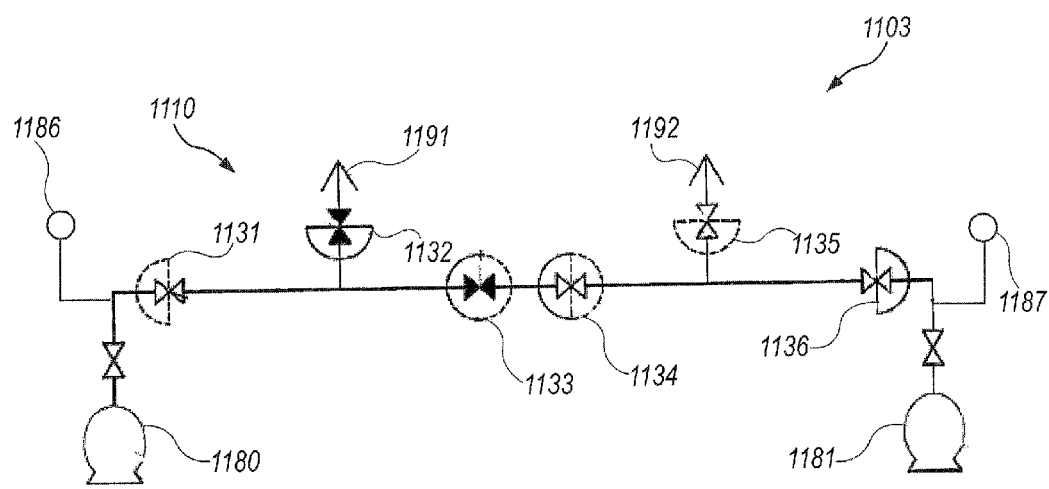
FIG. 14 is another schematic illustration of the exemplary pressure system of FIG. 11 illustrating the status of the tested fluid control components after completion of the testing steps of FIG. 12 and FIG. 13.

In the event that the first test step depicted in FIG. 12 and the second test step depicted in FIG. 13 are both successful, the schematic illustration 1101 for the test plan shown in FIG. 11 maybe be updated to the schematic illustration 1103 shown in FIG. 14, so as to indicate which aspects of the fluid control valves included within the test plan have passed testing. For example, as shown in the schematic illustration 1103, aspects of the fluid control components which passed testing in the first and second test steps can be marked with a solid semi-circle symbol, and while any remaining aspects of the fluid control components which have not yet passed testing can remain marked with a dashed semi-circle symbol. In this way the schematic illustration 1103 of the pressure system displayed on the computer system can be used to indicate which aspects in the test plan still need to be tested. The schematic illustration can also be used plan as to how the fluid control components of the piping system 1110 may be reconfigured to form the additional fluid pathways able to test those remaining aspects.

Figure 15:
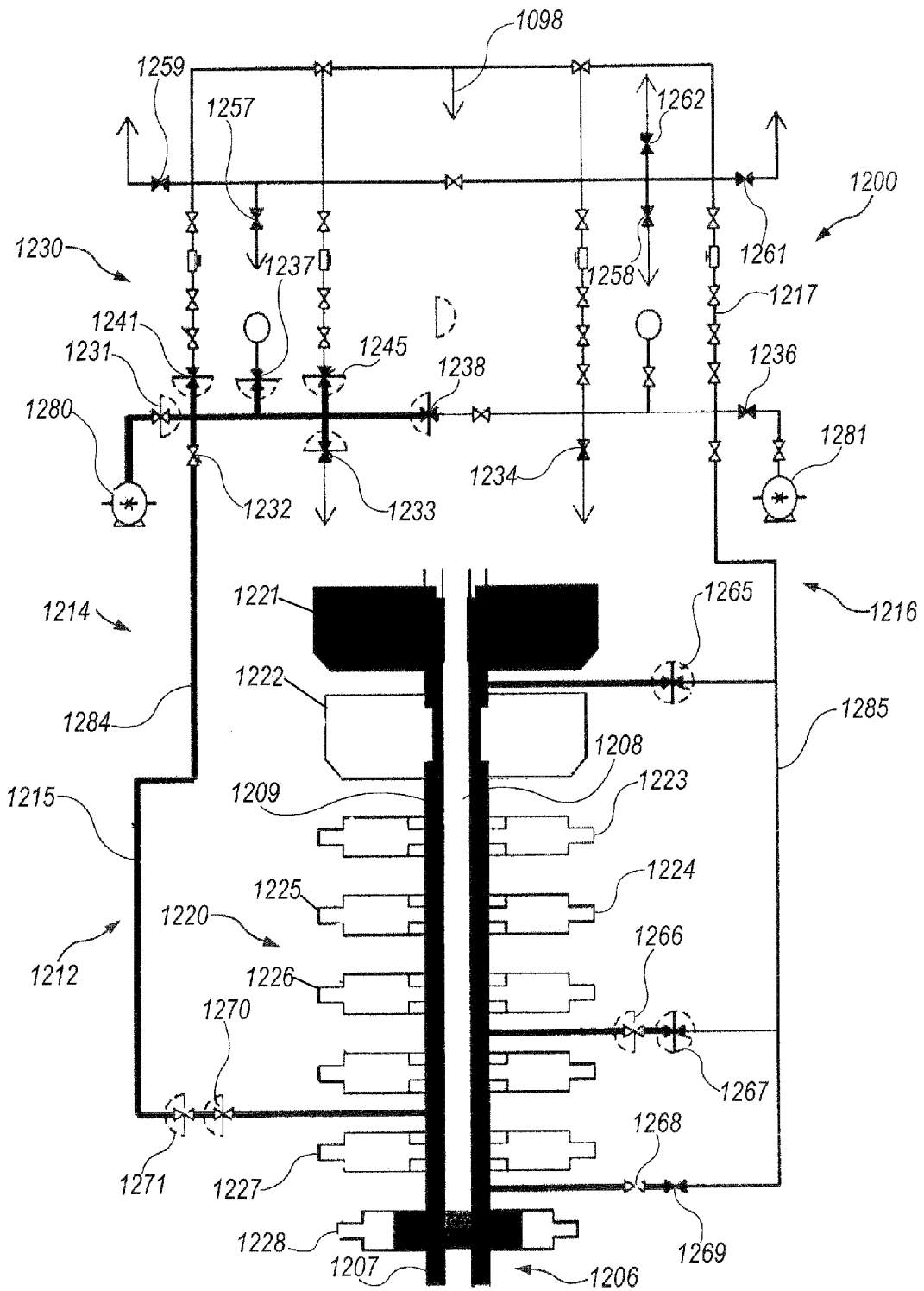
FIG. 15 is a schematic illustration of another pressure system for a subsea BOP stack and choke manifold of an oil rig defining a test plan for specific fluid control components included within the pressure system, in accordance with another representative embodiment.

Illustrated in FIG. 15 is a schematic illustration 1200 of another the piping system 1210 for the subsea BOP stack 1220 and choke manifold 1230 of an oil rig. As with the pressure systems discussed above, piping system 1210 includes a plurality of fluid control components which can be configured to define a plurality of fluid pathways. In the embodiment of FIG. 15, moreover, the schematic illustration 1200 has been modified using the previously-described methodology and descriptors to incorporate a specific test plan for a sub-system 1214 of the piping system 1210, which sub-system 1212 has been configured into a particular fluid pathway 1215. The fluid control components to be tested in the test plan and the fluid pathway 1215 are marked in accordance with the legend of FIG. 10A. As identified in the schematic illustration 1200, the testable fluid control components incorporated into the test plan for piping sub-system 1212 include:

Valve 1241, bottom aspect;
Valve 1237, bottom aspect;
Valve 1245, bottom aspect;
Valve 1233, top aspect;
Valve 1238, left aspect;
Valve 1231, right aspect;
Valve 1265, left aspect and right aspect;
Valve 1271, left aspect;
Valve 1270, left aspect;
Valve 1266, left aspect;
Valve 1267, left aspect and right aspect;
Annular BOP 1221, with 4½" Tubing;
Annular BOP 1221, with 5¾" Tubing;
Annular BOP 1221, with 6⅞" Tubing; and
Test Ram BOP 1228.

Given the number and variety of fluid control components and aspects selected for testing in piping sub-system 1014, it is not possible to test all of the fluid control components during the same test step. Therefore, in a first test step a 5¾" tubing can be positioned within the BOP stack 1220 and the piping sub-system 1214 can be arranged to form a high-pressure fluid pathway 1215, in order to subject the following fluid control components and aspects to pressure testing:

Valve 1241, bottom aspect;
Valve 1237, bottom aspect;
Valve 1245, bottom aspect;
Valve 1233, top aspect;
Valve 1238, left aspect;
Valve 1265, left aspect;
Valve 1267, left aspect;
Annular BOP 1221, with 5¾" Tubing; and
Test Ram BOP 1228.

It should be noted that valve 1269 associated with kill line 1285 is not included in the test plan, but is still shown on the schematic illustration 1200 and must still be shut during the test step in order to completely close off and configure fluid pathway 1215 for maintaining the high fluid pressure test fluid supplied by pressure source 1280.

During configuration of piping sub-system 1214 into the high-pressure fluid pathway 1215, the rest of the fluid control components of the piping system 1210 not included the pressure test may also be configured to form a second piping sub-system 1216 having a fluid pathway 1217 which is vented to atmosphere through a single bleed line, such as bleed line 1098. As illustrated in FIG. 15, this can be accomplished by closing valves 1233, 1234, 1257, 1258, 1259, 1261 and 1262 in order to seal off the remaining bleed lines as alternative exit pathways, along with closing valve 1236 to seal off the secondary fluid pumping unit 1281.

As shown by the figures above, various fluid pathways can be defined from the test plan to create the test steps necessary to pressure test all of the required aspects of the selected fluid control components in the pressure system. It will be understood that appropriate definition of sub-systems, fluid pathways and test steps permit all aspects of every component in the defined test plan to be tested. As previously described, multiple tests utilizing different valve and BOP closures will test each aspect of all of the fluid control components of the system which require testing. Reiterative testing will assist in isolating failures.

During the test planning stage, the user must provide information defining what constitutes adequate test coverage for that test plan, as well as design the test steps used in the test plan to satisfy the requirements for test coverage. It is possible that, for a given test plan, only certain aspects of a particular fluid control component need to be tested. The user will be able to define which aspects need to be tested to ensure complete test coverage. By default, the definition of adequate coverage can be provided with the schematic illustration for the complete pressure system, where the default definitions for complete testing can be stored. However, these defaults can be changed by the users on a per-test plan basis, depending on changing conditions or requirements at test time.

Once the fluid control components and their aspects have been defined for a pressure system to be tested, the user can tailor separate test steps to meet these coverage requirements and make sure all required component aspects are tested properly.

For each planned test step, the user decides which valves and/or BOP components should be opened and closed in order to route the pressurized test fluids to reach the correct components. The user will also have to specify which size of drill tubing is being run through the BOP stack, if any (as the given plan step might not test any BOP components). Thus, the user can explicitly define which aspects are to be tested during each planned test step.

In the event of failed tests involving multiple fluid control components, there are different logic processes or rules for determining whether or not a given aspect or fluid control component has passed testing. The user will be able to implement the rule that best suits her needs and requirements.

For instance, one option is the LAST TEST rule, which states that if some component or aspect that was under test failed to hold pressure so that the test step failed, then all component or aspects subject to pressure in that test step must be regarded as suspect. Therefore, by default, the pass/fail status for a given component aspect will match the pass/fail for the LAST TEST in which that component was tested. This logic process or rule ensures 100% reliability if all test steps in a test plan are successful, but is not optimal for isolating and detecting the causes for leaks.

Another option is the ANY TEST rule, which states that once a component or aspect is present in a test that passes, then that component or aspect is considered as having passed testing. Thus, the ANY TEST rule is an alternative logic process for determining the pass/fail status for a component aspect that allows a given component aspect which is part of a failed test to still be regarded as having passed testing, so long as the given component aspect was included in at least one other successful test. In these situations, the failure is assumed to have been caused by some other component involved in the failed test.

The above rules can be used to determine if an aspect of a component has passed or failed testing based on the tests it was present in, but do not determine if that component has been adequately tested. To be marked as having been adequately tested, all required aspects of a component must pass testing. For a valve requiring testing both the left side and the right side, this means that it must have two aspects tested (pressurized from the left side, pressurized from the right side) and both aspects must pass. For a pipe ram, VBR or annular BOP, this means that the component must be tested with all required sizes of drill tubing and pass testing with each one.

Figure 16:
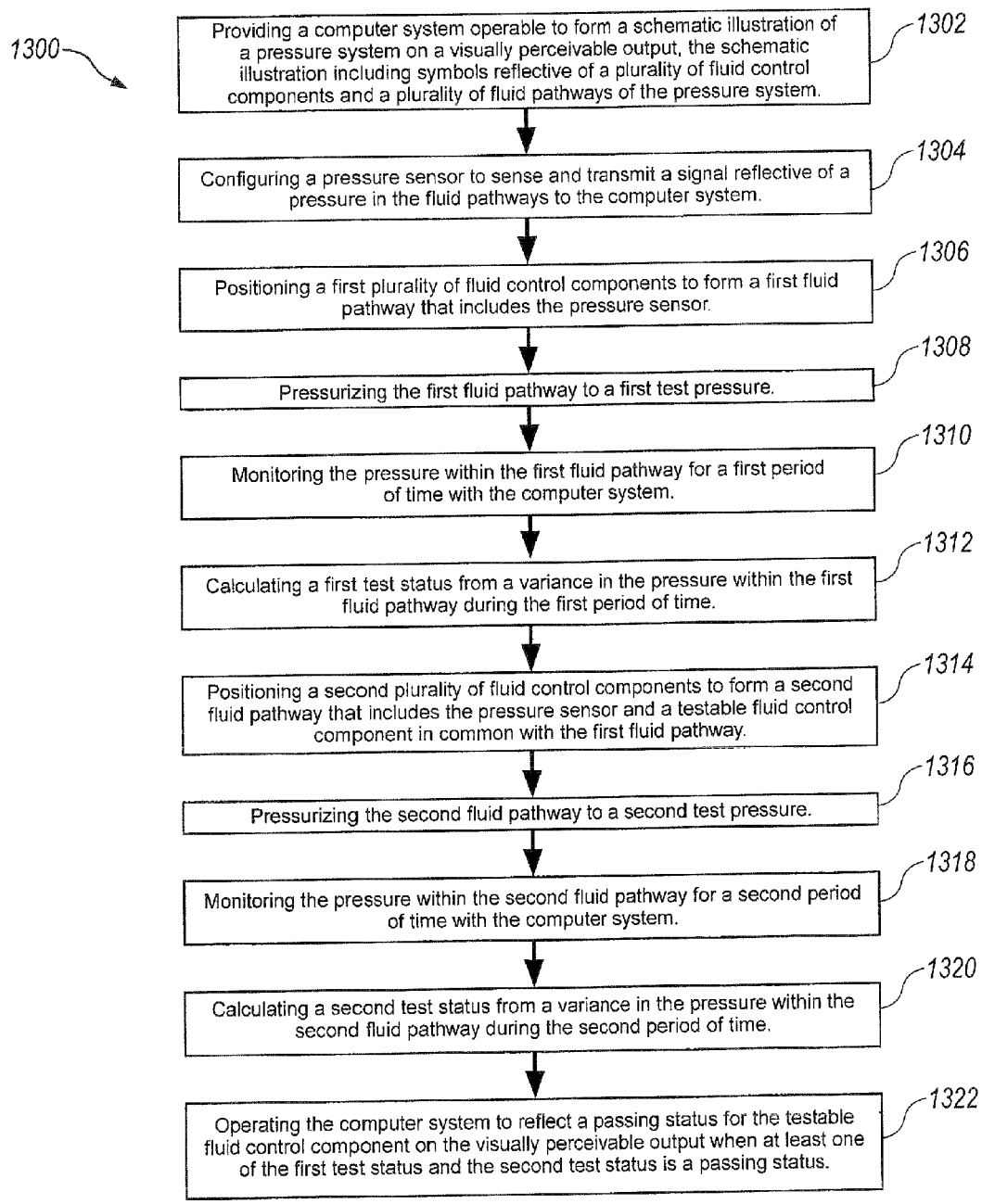
FIG. 16 is a flow chart depicting a method for testing the pressure integrity of a pressure system, in accordance with another representative embodiment.

Illustrated in FIG. 16 is a flow chart 1300 depicting a method for testing the pressure integrity of a pressure system having a plurality of fluid control components operable to define a plurality of fluid pathways, and at least one pressure sensor positioned to measure a pressure of a fluid contained within one of the fluid pathways. The method 1300 includes providing 1302 a computer system operable to form a schematic illustration of a pressure system on a visually perceivable output, which schematic illustration includes symbols reflective of a plurality of fluid control components and a plurality of fluid pathways of the pressure system, and configuring 1304 a pressure sensor to sense and transmit a signal reflective of a pressure in the fluid pathways to the computer system, and the computer system being configured to store data reflective of the pressure.

The method 1300 also includes positioning 1306 a first plurality of fluid control components to form a first fluid pathway that includes the pressure sensor, pressurizing 1308 the first fluid pathway to a first test pressure, monitoring 1310 the pressure within the first fluid pathway for a first period of time with the computer system, and calculating 1312 a first test status from a variance in the pressure within the first fluid pathway during the first period of time.

The method 1300 also includes positioning 1314 a second plurality of fluid control components to form a second fluid pathway that includes the pressure sensor and one or more testable fluid control components in common with the first fluid pathway, pressurizing 1316 the second fluid pathway to a second test pressure, monitoring 1318 the pressure within the second fluid pathway for a second period of time with the computer system, and calculating 1320 a second test status from a variance in the pressure within the second fluid pathway during the second period of time.

The method 1300 further includes operating 1318 the computer system to reflect a passing status for the one or more testable fluid control components on the visually perceivable output when at least one of the first test status and the second test status is a passing status.

An important feature of the present invention is the ability to generate meaningful reports and provide useful documentation summarizing the results of the leak detection test. After a set of test steps have been run, for instance, the leak detection system can compile a set of reports detailing the outcomes of each test step. To these reports can be added specific details on the testing status of the components in the system diagram. A list of all component aspects tested can be presented, along with a listing of the pressure tests that aspect was tested in, and whether or not that test step passed or failed. In addition, a summary can be given of each aspect with its pass/fail status computed using one of the rules above. If all required aspects pass, then the set of tests is deemed to provide adequate test coverage. The set of reports can also include a schematic illustration which graphically identifies which component aspects passed testing.

For example, shown in FIG. 17 is a typical summary test report 1400 as may be generated for the BOP components of the pressure system 1210 illustrated in FIG. 15, and which specifies in summary form which of the BOPs tested under the test plan have passed and which have failed. For example, as indicated at 1402, the low pressure (LP) portion of the test step for BOP3 failed due to a leak at another fluid control component located elsewhere on the fluid pathway. After identifying and correcting the leak the complete low pressure (LP)/high pressure (HP) test step for BOP3 was re-run as BOP 3a, which was successful, as indicated at 1404.

Figure 18:
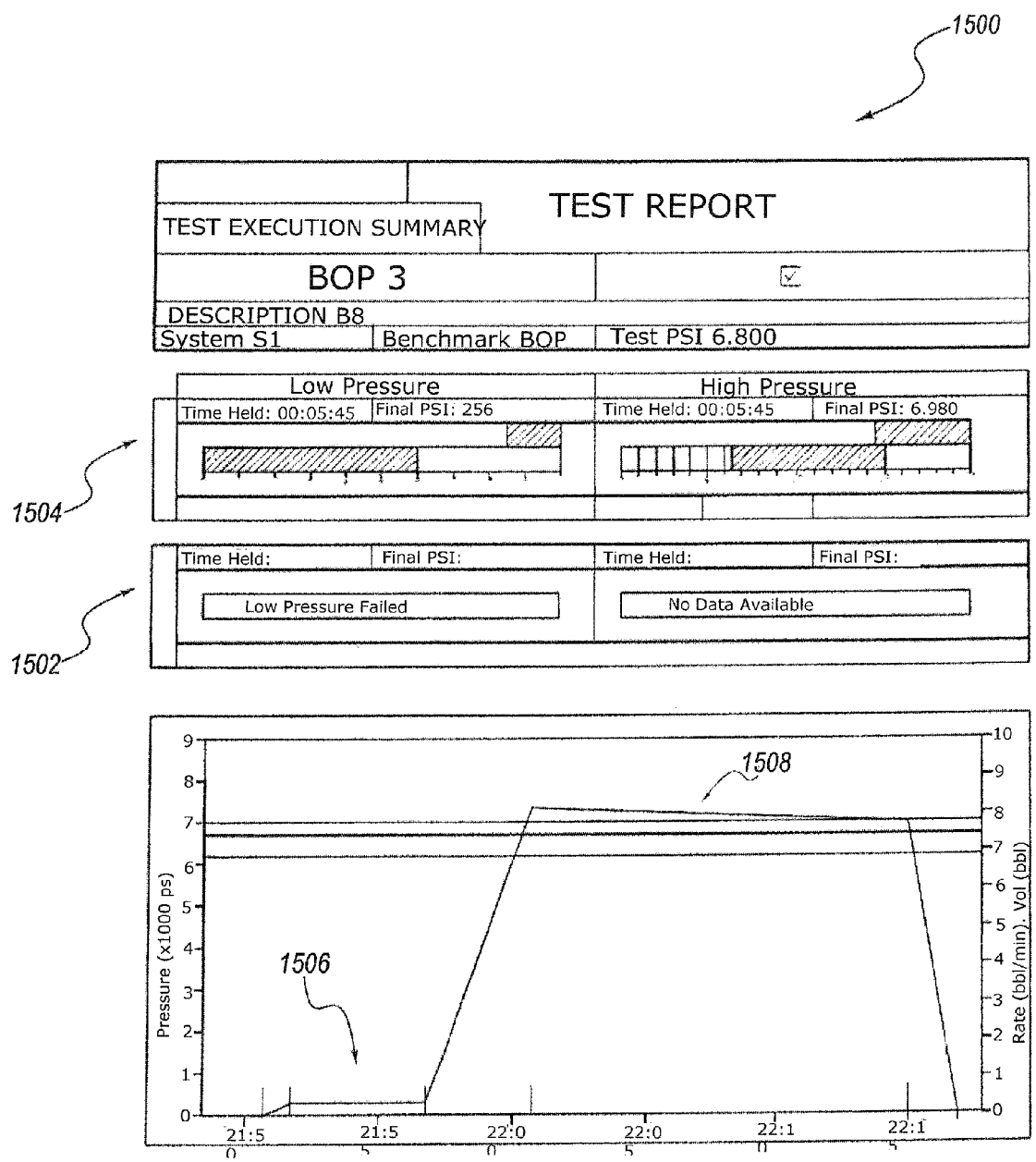
FIG. 18 is an illustration of a detailed test report, in accordance with another representative embodiment.

Expanded results for the individual BOP 3 test of FIG. 17 are included in the more detailed test report 1500 provided in FIG. 18. As can be seen, the initial failure of the LP portion of BOP3 test step is documented at 1502 and the subsequent successful BOP3a test step is documented at 1504. The report also provides both low pressure results 1506 and final (high pressure) pressure results 1508 in graphic form, thereby illustrating and documenting the test performance for the specific BOP component tested in BOP3 test step, similar to that shown with the schematic illustration 1200 in FIG. 15.

FIG. 19 is a "quick look" coverage report 1500 showing the fluid control components and aspects which are covered in a test plan similar to that shown with the schematic illustration 1200 in FIG. 15. Test components are listed along the left (A1, BR1, VR1 . . . ) along with the required aspect of the component to be tested (side or pipe size) and test steps are listed along the top (BOP1, BOP2, BOP3 . . . ). For instance, the test plan calls for annular A1 to be pressure tested with a drill pipe size of 4.500 inches during test step BOP1, for blind ram BR1 to be pressure tested without drill pipe during test step BOP3, for variable-bore pipe ram VBR 1 to be pressure tested with a drill pipe size of 5.500 inches during test step BOP4, for variable-bore pipe ram VBR2 to be pressure tested with a drill pipe size of 7.00 inches during test step BOP2, and for variable-bore pipe ram VBR3 to be pressure tested with a drill pipe size of 4.5 inches during test step BOPS. The test plan also calls for testing the top aspect of valves V3, V4, the bottom aspect of valves V8, V11, V13, V14, V16, V25, both the left and right aspects of valves V9, V10 and the left aspect of valves V40, V46 and V48.

The table portion of the coverage report 1500 of FIG. 19 indicates which of the various valve aspects will be included with the different BOP components during test steps BOP1 through BOPS. For example, when annular A1 is pressure tested during test step BOP1, the top aspect of V3, the bottom aspects of V8, V13 and V14, and the left aspects of V9, V40, V46 and V48 will also be pressure tested. Most of these valve aspects will be tested again during the test step BOP2 for the variable-bore pipe ram VBR2. Consequently, a certain level of redundancy and confidence is built into the test plan because most valve aspects can be tested multiple times over the course of the test plan.

An additional summary column (Covered) is also included to provide for a quick look verification of component coverage, if such a report was generated (as shown) where each required component and aspect had a check mark, the report would verify that all required components were validated. An optional message indicating that all components have passed, or a message indicating that n number of components did not pass, may be included in this report.

The one or more present inventions, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. While the examples present data from a BOP stack on a drilling rig, it is understood that embodiments of the presently disclosed system and method of detecting leaks work equally well for pressure systems and fluid systems of other types, as disclosed and discussed above. Thus, the examples provided are non-limiting examples.

The present inventions, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for testing the integrity of a pressure system, said pressure system having a plurality of fluid control components, a plurality of fluid pathways defined by said fluid control components, and at least one pressure sensor in fluid communication with said plurality of fluid pathways, said method comprising:
    forming, on an output device of a computer system, an illustration representative of said pressure system, said illustration including a plurality of fluid control symbols reflective of said plurality of fluid control components, said fluid control symbols reflecting at least one of an operating position and a test status of a fluid control component;
    receiving, by the computer system, a selection of an operating position for a first plurality of fluid control symbols to define a first fluid pathway within said illustration;
    receiving, by the computer system, a selection of an operating position for a second plurality of fluid control symbols to define a second fluid pathway within said illustration;
    receiving, by the computer system, a signal reflective of a pressure sensed by said pressure sensor;
    positioning a first plurality of fluid control components to form said first fluid pathway within said pressure system, said first fluid pathway configured to be individually pressurized and including said pressure sensor;
    pressurizing said first fluid pathway to a first test pressure, causing said pressure sensor to generate a signal reflective of a first pathway pressure;
    receiving, by the computer system, said signal reflective of said first pathway pressure at time $t_1$ and at time $t_2$;
    comparing, by the computer system, said first pathway pressure at time $t_1$ and at time $t_2$ and calculating, by the computer system, a first test status of said first fluid pathway from a difference in said first pathway pressure from time $t_1$ to time $t_2$;
    displaying on the output device said first test status;
    positioning a second plurality of fluid control components to form said second fluid pathway within said pressure system, said second fluid pathway configured to be individually pressurized and including said pressure sensor;
    pressurizing said second fluid pathway to a second test pressure, causing said pressure sensor to generate a signal reflective of a second pathway pressure;
    receiving, by the computer system, said signal reflective of said second pathway pressure at time $t_3$ and at time $t_4$;
    comparing, by the computer system, said second pathway pressure at time $t_3$ and at time $t_4$ and calculating, by the computer system, a second test status for said second fluid pathway from a difference in said second pathway pressure from time $t_3$ to time $t_4$;
    displaying on the output device said second test status;
    positioning a third plurality of fluid control components to form a third fluid pathway within said pressure system, said third fluid pathway being configured to receive said pressurized fluid if said first fluid pathway fails to maintain said first test pressure; and
    venting said third fluid pathway to atmosphere.

2. The method of claim 1, wherein said first plurality of fluid control components and said second plurality of fluid control components share at least one common fluid control component with a corresponding common fluid control symbol in said illustration.

3. The method of claim 2, further comprising operating said computer system to reflect a passing status onto said common fluid control symbol when at least one of said first test status and said second test status is a passing status.

4. The method of claim 1, wherein said second fluid pathway is contained entirely within said first fluid pathway.

5. The method of claim 1, wherein said second fluid pathway includes at least one fluid control component not included within said first fluid pathway.

6. The method of claim 1, wherein at least one of said plurality of fluid control components is a blowout preventer (BOP).

7. The method of claim 6, wherein said blowout preventer is selected from the group consisting of a test ram BOP, a blind ram BOP, a shear ram BOP, a pipe ram BOP, a variable pipe ram BOP, and an annular BOP.

8. The method of claim 1, wherein at least one of said plurality of fluid control components is selected from the group consisting of a rigid tubular conduit, a flexible tubular conduit, a valve, a fitting, and a fluid-tight seal.

9. The method of claim 1, wherein at least one of said plurality of fluid control components is a valve having a first side and a second side opposite said first side.

10. The method of claim 9, wherein:
    causing said first fluid pathway to be pressurized applies said first pathway pressure to said first side of said valve; and
    causing said second fluid pathway to be pressurized applies said second pathway pressure to said second side of said valve.

11. The method of claim 1, wherein calculating a first test status of said first fluid pathway from a difference in said first pathway pressure from time $t_1$ to time $t_2$ further comprises:
- calculating a leak detection value that is the absolute value of a ratio of said pressure at time $t_1$ and said pressure at time $t_2$ subtracted from unity;
- comparing said leak detection value against a leak threshold; and
- recording said first test status as a passing status when said leak detection value meets said leak threshold.

12. A method for testing the pressure integrity of a pressure system, said pressure system having a plurality of fluid control components configured to be operated to define a plurality of fluid pathways, and at least one pressure sensor in fluid communication with said plurality of fluid pathways, said method comprising:
- generating a schematic illustration of said pressure system on an output device of a computer system, said schematic illustration including symbols reflective of each of said plurality of fluid control components and each of said plurality of fluid pathways;
- receiving, by the computer system, a signal reflective of a pressure sensed by said pressure sensor;
- positioning a first plurality of fluid control components to form a first fluid pathway, said first fluid pathway configured to be individually pressurized and including said pressure sensor;
- pressurizing said first fluid pathway to a first test pressure;
- monitoring with said computer system a first pathway pressure for a first period of time;
- calculating with said computer system a first test status of said first fluid pathway from a variance in said first pathway pressure during said first period of time, said first test status being selected from a passing status and a fail status;
- positioning a second plurality of fluid control components to form a second fluid pathway, said second fluid pathway configured to be individually pressurized and including said pressure sensor and at least one tested fluid control component in common with said first fluid pathway;
- pressurizing said second fluid pathway to a second test pressure;
- monitoring with said computer system a second pathway pressure for a second period of time;
- calculating with said computer system a second test status of said second fluid pathway from a variance in said second pathway pressure during said second period of time, said second test status being selected from a passing status and a fail status;
- displaying on the output device a passing status for said tested fluid control component when at least one of said first test status and said second test status is a passing status;
- positioning a third plurality of fluid control components to form a third fluid pathway within said pressure system, said third fluid pathway being configured to receive said pressurized fluid if said first fluid pathway fails to maintain said first test pressure; and
- venting said third fluid pathway to atmosphere.

13. The method of claim 12, wherein said second fluid pathway is contained entirely within said first fluid pathway.

14. The method of claim 12, wherein said second fluid pathway includes at least one fluid control component not included within said first fluid pathway.

15. The method of claim 12, wherein said tested fluid control component is a blowout preventer (BOP) selected from the group consisting of a test ram BOP, a blind ram BOP, a shear ram BOP, a pipe ram BOP, a variable pipe ram BOP, and an annular BOP.

16. The method of claim 12, wherein monitoring with said computer system said first pathway pressure for a first period of time comprises:
- sensing said first pathway pressure with said pressure sensor at time $t_0$;
- recording data reflective of said first pathway pressure at time $t_0$ on said computer system;
- sensing said first pathway pressure with said pressure sensor at time $t_1$;
- recording data reflective of said first pathway pressure at time $t_1$ on said computer system;
- calculating a leak detection value that is the ratio of said first pathway pressure at time $t_0$ and said first pathway pressure at time $t_1$ subtracted from unity;
- generating a leak detection signal reflective of said leak detection value; and
- displaying said leak detection value as a function of time on the output device.

17. The method of claim 12, further comprising:
- pressurizing said first fluid pathway to a first reduced pathway pressure prior to said first period of time, said first reduced pathway pressure being less than one fifth of said first pathway pressure; and
- monitoring with said computer system said first pathway pressure for said additional period of time; and
- calculating with said computer system a first reduced pressure test status of said first fluid pathway from a variance in said first reduced pathway pressure during said first period of time, said first reduced pressure test status being selected from a passing status and a fail status.

18. A leak detection system comprising:
- a pressure system having a plurality of fluid control components, said fluid control components configured to be operated to form a first fluid pathway and a second fluid pathway, said first fluid pathway and said second fluid pathway each configured to be separately pressurized and each including at least one tested fluid control component contained within both said first fluid pathway and said second fluid pathway, the fluid control components further configured to be operated to form a third fluid pathway within said pressure system, said third fluid pathway being configured to receive a pressurized fluid if said first fluid pathway fails to maintain a test pressure and vent to atmosphere;
- a computer system to display a schematic illustration of said pressure system, said schematic illustration including a plurality of fluid control symbols reflective of said fluid control components forming said first fluid pathway and said second fluid pathway;
- a source of pressurized fluid in fluid communication with said pressure system, said source of pressurized fluid configured to be operated to separately supply said pressurized fluid to each of said first fluid pathway and said second fluid pathway; and
- at least one pressure sensor in fluid communication with said first fluid pathway and said second fluid pathway and in electrical communication with said computer system, said at least one pressure sensor being configured to generate and transmit a signal reflective of a pressure sensed by said pressure sensor to said computer system;
- said computer system configured to monitor a first pathway pressure within first fluid pathway when pressurized to a first test pressure, and to calculate a first test status of said first fluid pathway from a variance in said first pathway pressure during a first period of time, said first test status being selected from a passing status and a fail status;

said computer system configured to monitor a second pathway pressure within second fluid pathway when pressurized to a second test pressure, and to calculate a second test status of said second fluid pathway from a variance in said second pathway pressure during a second period of time, said second test status being selected from a passing status and a fail status, and said computer system configured to be operated to display a passing status for said tested fluid control component with said schematic illustration when at least one of said first test status and said second test status is a passing status.

* * * * *